United States Patent
Desai et al.

(10) Patent No.: US 10,771,562 B2
(45) Date of Patent: Sep. 8, 2020

(54) ANALYZING DEVICE-RELATED DATA TO GENERATE AND/OR SUPPRESS DEVICE-RELATED ALERTS

(71) Applicant: Accenture Global Solutions Limited, Dublin (IE)

(72) Inventors: Vijay Desai, San Diego, CA (US); Kun Qiu, San Diego, CA (US); Qiang Song, San Diego, CA (US)

(73) Assignee: Accenture Global Solutions Limited, Dublin (IE)

( * ) Notice: Subject to any disclaimer, the term of this patent is extended or adjusted under 35 U.S.C. 154(b) by 29 days.

(21) Appl. No.: 16/225,983

(22) Filed: Dec. 19, 2018

(65) Prior Publication Data
US 2020/0204628 A1    Jun. 25, 2020

(51) Int. Cl.
*H04L 12/24*    (2006.01)
*H04L 29/08*    (2006.01)
*H04M 3/493*    (2006.01)

(52) U.S. Cl.
CPC ........ *H04L 67/125* (2013.01); *H04L 41/0636* (2013.01); *H04L 41/0668* (2013.01); *H04L 41/0893* (2013.01); *H04L 41/12* (2013.01); *H04L 41/14* (2013.01); *H04L 41/145* (2013.01); *H04L 41/16* (2013.01); *H04L 41/5064* (2013.01); *H04L 67/025* (2013.01); *H04L 67/30* (2013.01); *H04M 3/493* (2013.01)

(58) Field of Classification Search
CPC ....... H04L 41/145; H04L 41/14; H04L 41/06; H04L 41/22; H04L 67/303; H04L 67/34; H04L 41/0803; G06K 9/00637; H04N 5/2253; H04N 5/2257; H04W 16/18; H04W 16/28; H04W 24/02; G06F 9/4411; G16H 40/40
See application file for complete search history.

(56) References Cited

U.S. PATENT DOCUMENTS

| | | | |
|---|---|---|---|
| 9,460,155 B2 | 10/2016 | Verma et al. | |
| 10,038,611 B1* | 7/2018 | Wu | H04L 41/14 |
| 10,516,999 B1* | 12/2019 | Desai | G06K 9/00637 |
| 2008/0154957 A1* | 6/2008 | Taylor | G06F 9/4411 |
| 2017/0084167 A1 | 3/2017 | Bump et al. | |

OTHER PUBLICATIONS

Appzen, "Audit Every Dollar of Spend," http://www.appzen.com/, Mar. 16, 2018, 7 pages.

(Continued)

*Primary Examiner* — Kyung H Shin
(74) *Attorney, Agent, or Firm* — Harrity & Harrity, LLP

(57) ABSTRACT

A device may receive data related to operations of a plurality of managed devices. The device may determine, after receiving the data, a multi-entity profile for the data. The device may determine, using the multi-entity profile, a set of sub-models for the data after determining the multi-entity profile. The set of sub-models may be associated with processing the data in a contextualized manner. The device may generate a model based on the set of sub-models. The device may perform one or more actions related to the plurality of managed devices or the at least one alert based on respective scores associated with the plurality of managed devices after generating the model.

20 Claims, 14 Drawing Sheets

(56) References Cited

OTHER PUBLICATIONS

CA Technologies, "Application and Infrastructure Monitoring Tools", https://www.ca.com/us/products/application-and-infrastructure-monitoring.html, Feb. 13, 2016, 11 pages.
Hewlett Packard Enterprise Development LP, "HPE OneView", https://www.hpe.com/us/en/integrated-systems/software.html, 2018, 21 pages.
Extended European Search Report for Application No. EP19212369.3, dated Jan. 14, 2020, 9 pages.

* cited by examiner

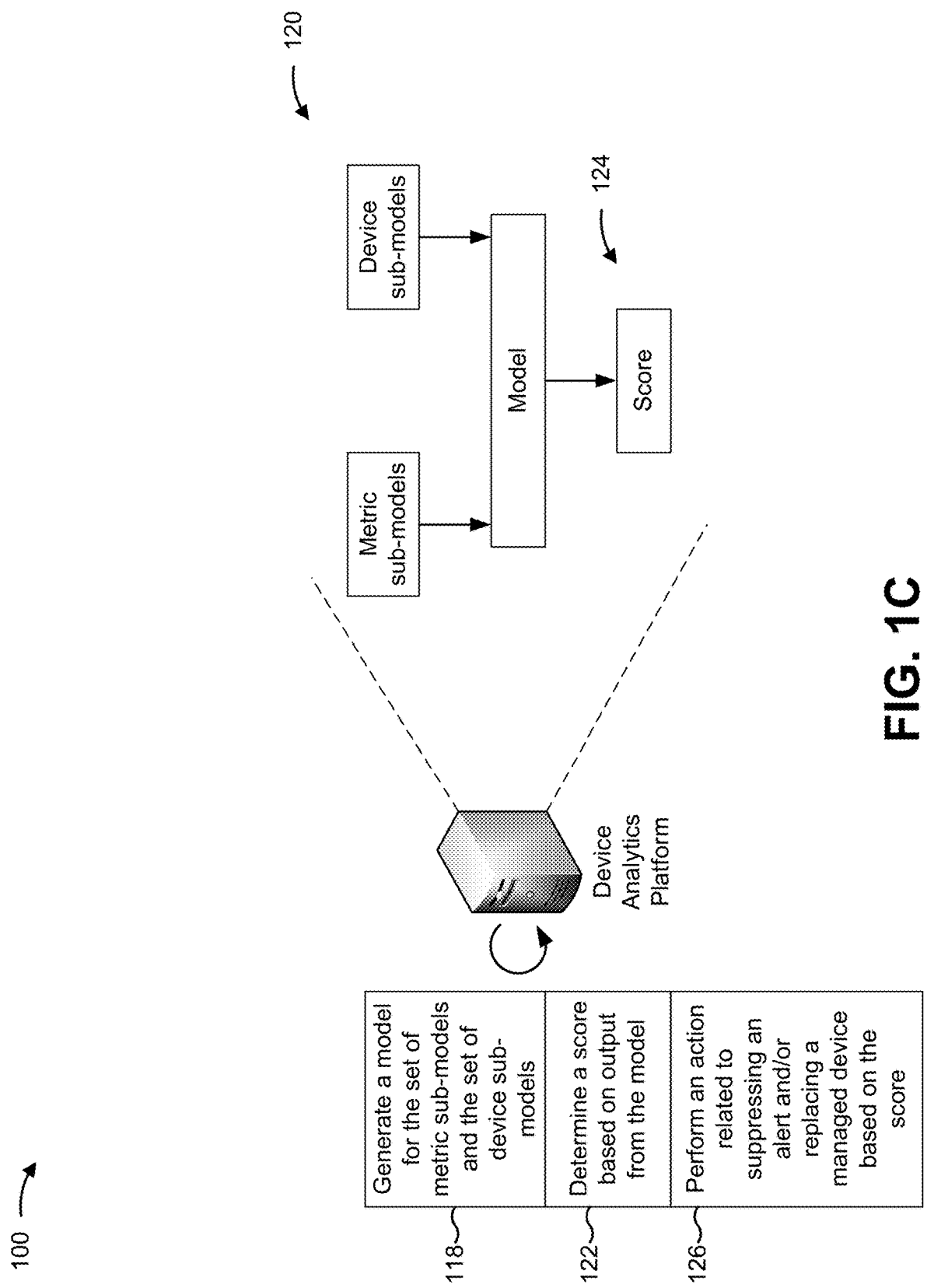

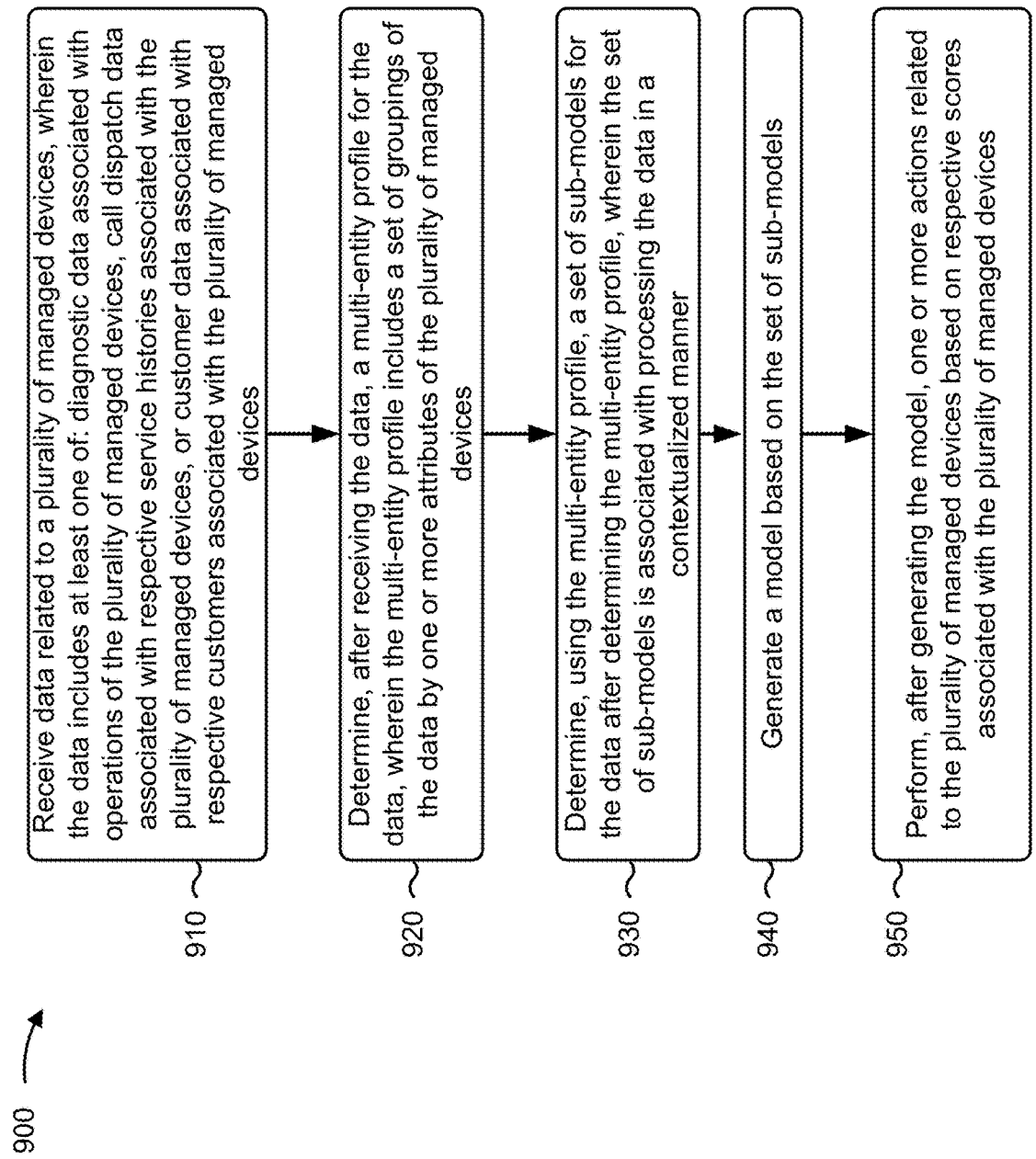

US 10,771,562 B2

ANALYZING DEVICE-RELATED DATA TO GENERATE AND/OR SUPPRESS DEVICE-RELATED ALERTS

BACKGROUND

An organization is associated with various devices that are used for operations of the organization. A monitoring system monitors operations of the various devices associated with the organization by collecting data related to the operations of the various devices. The monitoring system tracks metrics associated with the operations based on the data and generates alerts based on the metrics.

SUMMARY

According to some implementations, a method may comprise: receiving, by a device, an indication of at least one alert related to operations of a plurality of managed devices and data related to the operations of the plurality of managed devices, wherein the indication of the at least one alert is received from a monitoring system that is monitoring the operations of the plurality of managed devices; determining, by the device and after receiving the data, a multi-entity profile for the data, wherein the multi-entity profile includes a set of groupings of the data by one or more attributes of the plurality of managed devices; determining, by the device and using the multi-entity profile, a set of sub-models for the data after determining the multi-entity profile, wherein at least one sub-model, of the set of sub-models, is associated with contextualizing the data to the plurality of managed devices; generating, by the device, a model based on the set of sub-models; determining, by the device and utilizing the model after generating the model, respective scores for the plurality of managed devices, wherein the respective scores are used to identify at least one of: one or more alerts, of the at least one alert, to suppress, or one or more managed devices, of the plurality of managed devices, to replace; and performing, by the device, one or more actions related to at least one of the plurality of managed devices and the at least one alert after determining the respective scores for the plurality of managed devices.

According to some implementations, a device may comprise: one or more memories; and one or more processors, communicatively coupled to the one or more memories, to: receive at least one alert related to operations of a plurality of managed devices and data related to the operations of the plurality of managed devices, wherein the at least one alert is received from a device monitoring system associated with the plurality of managed devices, and wherein the data related to the operations is received from the plurality of managed devices; determine, after receiving the data, a multi-entity profile for the data based on one or more attributes of the plurality of managed devices; determine, using the multi-entity profile, a set of sub-models for the data related to the operations after determining the multi-entity profile, wherein the set of sub-models is associated with processing the data in a contextualized manner; generate a model based on the set of sub-models, wherein the model is associated with identifying at least one of: one or more alerts, of the at least one alert, to suppress, or one or more managed devices, of the plurality of managed devices, to replace; and perform one or more actions related to the plurality of managed devices or the at least one alert after determining respective scores for the operations.

According to some implementations, a non-transitory computer-readable medium may store instructions, the instructions comprising: one or more instructions that, when executed by one or more processors, cause the one or more processors to: receive data related to a plurality of managed devices, wherein the data includes at least one of: diagnostic data associated with operations of the plurality of managed devices, call dispatch data associated with respective service histories associated with the plurality of managed devices, or customer data associated with respective customers associated with the plurality of managed devices; determine, after receiving the data, a multi-entity profile for the data, wherein the multi-entity profile includes a set of groupings of the data by one or more attributes of the plurality of managed devices; determine, using the multi-entity profile, a set of sub-models for the data after determining the multi-entity profile, wherein the set of sub-models is associated with processing the data in a contextualized manner; generate a model based on the set of sub-models; and perform, after generating the model, one or more actions related to the plurality of managed devices based on respective scores associated with the plurality of managed devices.

BRIEF DESCRIPTION OF THE DRAWINGS

FIGS. 7-9 are flow charts of example processes for analyzing device-related data to generate and/or suppress device-related alerts.

DETAILED DESCRIPTION

Figure 1A:
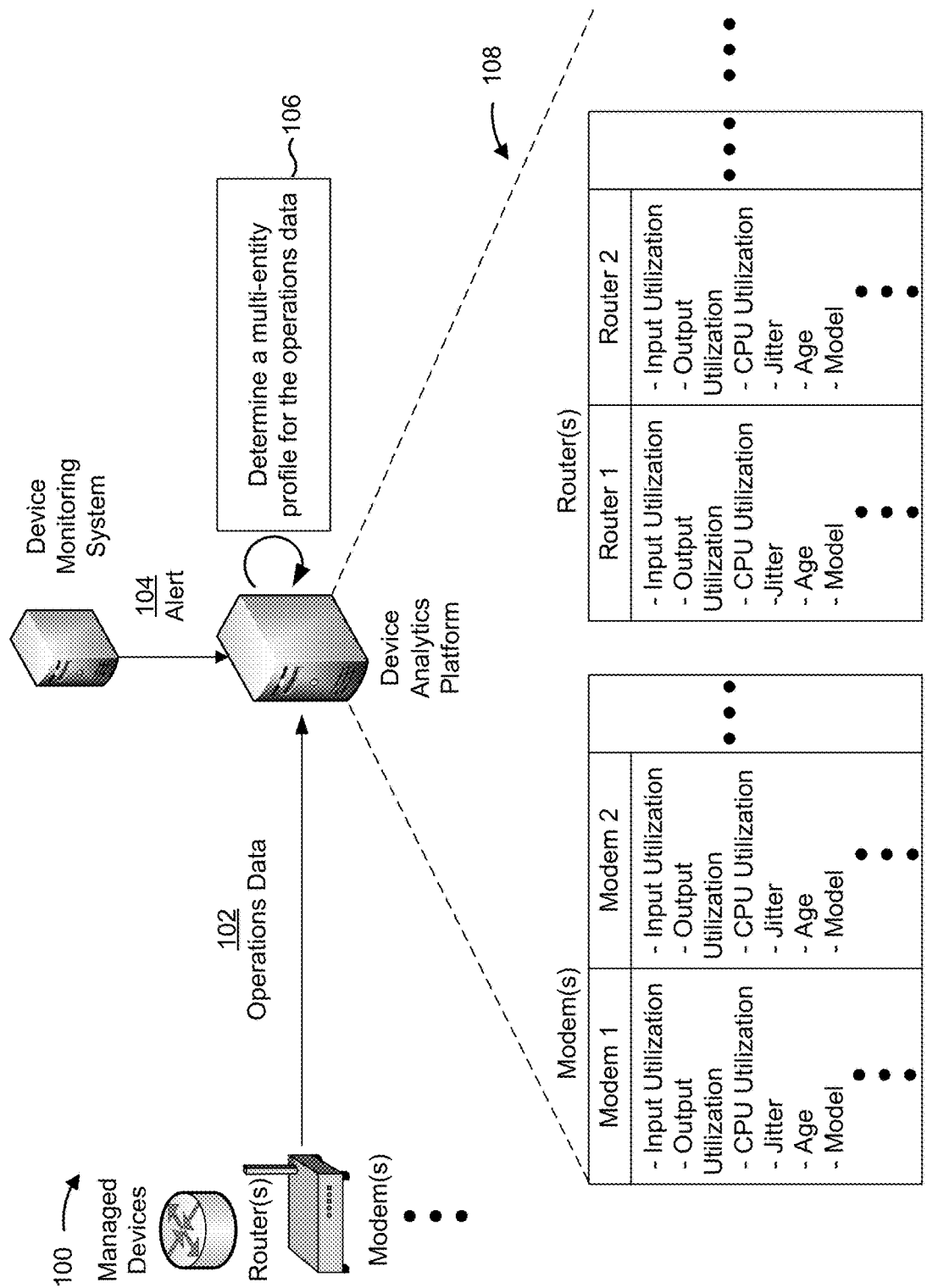
FIGS. 1A-4B are diagrams of example implementations described herein.

The following detailed description of example implementations refers to the accompanying drawings. The same reference numbers in different drawings may identify the same or similar elements.

An organization may be associated with various devices that are used for operations of the organization. For example, the various devices may include client devices (e.g., computers, mobile phones, and/or the like), network devices (e.g., routers, modems, and/or the like), server devices, and/or the like. In some cases, the organization uses a monitoring system to monitor operations of the various devices associated with the organization. For example, the monitoring system collects data related to the operations of the various devices and analyzes the data. The monitoring system tracks metrics associated with the operations based on the data and generates alerts based on the metrics.

Alert generation by the monitoring system frequently relies on use of static thresholds, where values for the metrics are compared to the static thresholds for determination of whether to generate an alert. In addition, alert generation by the monitoring system is not contextualized to the various devices, such that the determination of whether to generate an alert is based on normal performance of the device, an age of the device, a performance of other devices associated with the same organization, and/or the like. This reduces an accuracy of the monitoring system's analysis of the data and results in a significant percentage of generated alerts being false positive alerts. The false positive alerts cause delay with regard to addressing (e.g., fixing, attempting to fix, documenting, and/or the like) an actual issue with the various devices, consume significant computing resources of a device that receives the false positive alerts, and/or the like. In addition, the false positive alerts consume a significant amount of time and/or effort of network engineers for investigation of the false positive alerts by the network engineers and/or manual adjustment of thresholds implemented by the monitoring system. Further, the false positive alerts cause true positive alerts to be missed, which can cause downstream issues as other systems and/or devices are impacted by actual issues associated with the true positive alerts.

Some implementations described herein provide a device analytics platform that receives data related to operations of various devices associated with an organization, and processes the data in a contextualized manner (e.g., using "big data" and/or machine learning techniques) to determine whether to replace one or more of the various devices, to suppress an alert generated by a monitoring system that is monitoring the operations of the various devices, and/or the like. In this way, the device analytics platform is capable of reducing or eliminating false positive alerts that are sent to an administrator of the various devices (e.g., to a server associated with the administrator), while maintaining true positive alerts. This improves an accuracy of generating alerts related to the operations of the various devices relative to a monitoring system, thereby conserving computing resources that would otherwise be consumed as a result of less accurate generation of alerts. In addition, reducing or eliminating false positive alerts reduces or eliminates a delay associated with fixing an actual issue with one or more of the various devices that would otherwise occur as a result of the false positive alerts. Further, this conserves computing resources that would otherwise be consumed as a result of the false positive alerts being received by a device associated with an administrator. Further, this reduces costs associated with managing a set of managed devices associated with an organization by reducing or eliminating usage of organizational resources for investigation of false positive alerts. Further, this reduces or eliminates the occurrence of downstream issues to other devices and/or systems that would otherwise result from a missed positive alert.

Figure 1B:
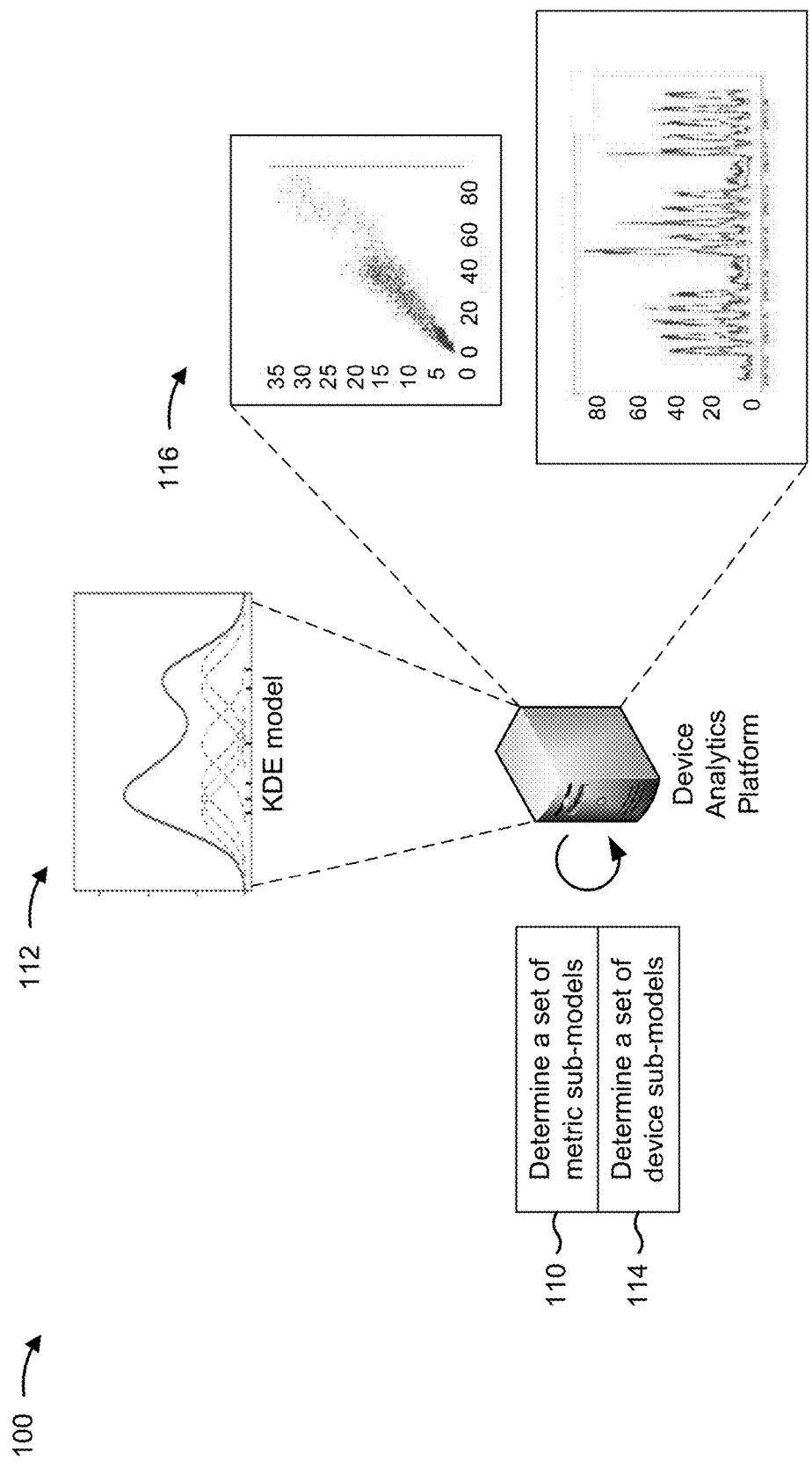

FIGS. 1A-1C are diagrams of an example implementation 100 described herein. As shown in FIG. 1A, implementation 100 includes a set of managed devices, a device monitoring system, and a device analytics platform. As shown in FIG. 1A, the set of managed devices may include various network devices, such as one or more routers, one or more modems, and/or the like. In some implementations, the set of managed devices may include a set of client devices, a set of server devices, and/or the like. In implementation 100, the device monitoring system is monitoring the set of managed devices. For example, the device monitoring system may monitor operations of the set of managed devices and may generate alerts based on tracking metrics related to the operations of the set of managed devices.

As shown by reference number 102, the device analytics platform may receive operations data from the set of managed devices. For example, the device analytics platform may receive the operations data during operations of the set of managed devices, based on requesting the operations data from the set of managed devices, in a streaming manner, in real-time or near real-time, from a monitoring system or a data collection system that is between the device analytics platform and the set of managed devices and that monitors operations data from the set of managed devices, and/or the like. In some implementations, the operations data for a managed device may identify an input utilization for the managed device, an output utilization for the managed device, a central processing unit (CPU) utilization of the managed device, a jitter of communications of the managed device, a quantity of tasks being performed by the managed device, a quantity of packets sent to and/or from the managed device, and/or the like. Additionally, or alternatively, the operations data may identify one or more attributes of a managed device, such as a type of the managed device (e.g., a type such as a router, a modem, a client device, a server device, and/or the like), an age of the managed device, a location of the managed device, a brand of the managed device, a product line of the managed device (e.g., associated with the same brand), and/or the like. In some implementations, the operations data may be time-series data.

As shown by reference number 104, the device analytics platform may receive an alert from the device monitoring system. For example, the device analytics platform may receive the alert when the device monitoring system generates the alert based on tracking metrics associated with the operations of the set of managed devices. In some implementations, the alert may indicate that the device monitoring system has detected an issue with the operations of the set of managed devices. For example, the device monitoring system may generate the alert based on detecting that a value for a metric has satisfied a threshold, is outside of a range of values, and/or the like.

As shown by reference number 106, the device analytics platform may determine a multi-entity profile for the operations data. For example, the device analytics platform may determine a multi-entity profile for the operations data after receiving the operations data, after receiving the alert, based on receiving input from a user of the device analytics platform to determine the multi-entity profile, and/or the like. Additionally, or alternatively, and continuing with the previous example, the device analytics platform may determine a multi-entity profile periodically, according to a schedule, as updated operations data is received from the set of managed devices, and/or the like. In this way, the device analytics platform may update a multi-entity profile, thereby improving an accuracy of the multi-entity profile and/or an accuracy of operations of the device analytics platform that use the multi-entity profile.

In some implementations, a multi-entity profile may include a set of groupings of the operations data by a set of attributes included in the operations data. For example, the multi-entity profile may organize operations data by managed device, by location (e.g., a location of a managed device), by brand (e.g., a brand associated with a managed device), and/or the like. Continuing with the previous example, a multi-entity profile for a managed device may include data related to the operations of the managed device, that identifies a location of the managed device, that identifies a brand of the managed device, that identifies values for one or more metrics associated with the managed device, and/or the like.

In some implementations, the device analytics platform may organize the operations data for the multi-entity profile based on unique identifiers included in the data (e.g., unique identifiers that uniquely identify a managed device associated with the operations data, a location associated with the operations data and/or a managed device, a brand associated with the operations data and/or a managed device, and/or the like). In some implementations, the unique identifiers may be included in the operations data as an attribute of the operations data (e.g., as a field with a unique value, such as a name, an identification number, and/or the like), and the device analytics platform may organize the operations data based on the unique identifiers included as the attribute in the operations data.

Additionally, or alternatively, the device analytics platform may process the operations data to identify the unique identifiers. For example, the device analytics platform may process the operations data using a text processing technique, such as a natural language processing technique, a text analysis technique, and/or the like. Continuing with the previous example, the device analytics platform may process the text to identify an alphanumeric string, a symbol, a code, and/or the like included in the operations data (e.g., that indicates a presence of a unique identifier, that is a unique identifier, and/or the like), and may identify a unique identifier included in the text by comparing the alphanumeric string, the symbol, the code, and/or the like to information stored in a data structure and/or in memory resources of the device analytics platform to determine which unique identifiers are included in the operations data.

Additionally, or alternatively, and as another example, the device analytics platform may process the data using a model (e.g., a machine learning model, an artificial intelligence model, and/or the like) to identify a unique identifier included in the operations data. For example, the device analytics platform may use the model to process text to identify an alphanumeric string, a symbol, a code, and/or the like included in the operations data (e.g., based on having been trained to identify unique identifiers in the operations data).

In some implementations, the device analytics platform may portion operations data from the set of managed devices into a training set, a validation set, a test set, and/or the like. In some implementations, the device analytics platform may train a machine learning model described herein using, for example, a factorization machine, a random forest, gradient boosting, a kernel density estimation (KDE) model, and/or the like, and based on the training set of the operations data.

In some implementations, the training set of data may be specific to a managed device, to an attribute of the set of managed devices, and/or the like. This provides more accurate detection of issues related to operations of the set of managed devices. This provides the device analytics platform with the capability to identify different issues, to identify the same issue regardless of deviations in performance across the set of managed devices, differences in attributes across the set of managed devices, and/or the like included in the operations data.

In some implementations, training of the machine learning model may include supervised training. For example, a user of the device analytics platform may manually classify operations data to train the machine learning model. This may increase an accuracy of training of the machine learning model and/or may reduce an amount of time needed to train the machine learning model.

In some implementations, the device analytics platform may use a factorization machine technique to train a machine learning model. For example, the factorization machine technique may train the machine learning model on features included in a data set. Additionally, or alternatively, the device analytics platform may use a random forest technique to train a machine learning model. For example, the device analytics platform may use the random forest technique to train the machine learning model by constructing multiple decision trees from the operations data. Additionally, or alternatively, the device analytics platform may train the machine learning model using a gradient boosting technique. For example, the device analytics platform may use the gradient boosting technique to generate a prediction model based on a data set.

In some implementations, the device analytics platform may use a logistic regression classification technique to determine a categorical outcome (e.g., attributes included in operations data, metrics determined from the operations data, and/or the like). Additionally, or alternatively, the device analytics platform may use a naïve Bayesian classifier technique. In this case, the device analytics platform may perform binary recursive partitioning to split the operations data of the minimum feature set into partitions and/or branches, and may use the partitions and/or branches to perform predictions (e.g., that the operations data includes particular attributes, that the operations data identifies particular metrics, and/or the like). Based on using recursive partitioning, the device analytics platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the device analytics platform may use a support vector machine (SVM) classifier technique to generate a non-linear boundary between data points in the training set. In this case, the non-linear boundary is used to classify test data (e.g., operations data) into a particular class (e.g., a class associated with a particular set of attributes included in operations data, an issue included in operations data, and/or the like).

In some implementations, rather than training a model, the device analytics platform may receive a model from another device (e.g., a server device). For example, a server device may generate a model based on having trained the model in a manner similar to that described above and may provide the model to the device analytics platform (e.g., may pre-load the device analytics platform with the model, may receive a request from the device analytics platform for the model, and/or the like). In some implementations, the device analytics platform may perform a lookup to identify a model for operations data associated with a managed device. For example, the device analytics platform may perform a lookup of a model associated with a managed device based on one or more attributes of the managed device. In other words, the device analytics platform may utilize various models to identify a set of issues included in the operations data, thereby increasing an accuracy of identifying the set of issues.

Reference number 108 shows example multi-entity profiles that the device analytics platform may generate. As shown, a multi-entity profile may organize the operations data that the device analytics platform received by type of device, by managed device, by location of a managed device, by age of a managed device, and/or the like. In this way, a multi-entity profile facilitates quick and easy access to operations data in an organized manner. This conserves processing resources of the device analytics platform relative to not using a multi-entity profile, facilitates training of a model to identify issues in operations data based on attributes included in the operations data (e.g., the device analytics platform may train the model on a particular type of device or different types of devices generally, on a managed device or different managed devices generally, and/or the like), thereby improving an accuracy of the model with regard to identifying issues in operations data.

Turning to FIG. 1B, and as shown by reference number 110, the device analytics platform may determine a set of metric sub-models. For example, the device analytics platform may determine a set of metric sub-models using the multi-entity profile, after determining the multi-entity profile, based on receiving input from a user of the device analytics platform to determine the set of metric sub-models, according to a schedule, periodically, and/or the like. In some implementations, the device analytics platform may determine the metric sub-model based on the multi-entity profile. For example, the device analytics platform may use the multi-entity profile (e.g., the manner in which the multi-entity profile organizes the operations data) to determine the set of metric sub-models. Continuing with the previous example, the device analytics platform may select, from the multi-entity profile, operations data associated with a managed device, operations data for a particular time period, and/or the like to determine the set of metric sub-models.

In some implementations, a metric sub-model may identify a pattern, a trend, and/or the like for a set of metrics associated with operations of a managed device. For example, the metric sub-model may identify a pattern, a trend, and/or the like of the set of metrics over time, at particular times of the day or days of the week, when the set of managed devices is performing particular functions, and/or the like. In this way, a metric sub-model may identify operational characteristics over time of a managed device, thereby contextualizing the operations data to the managed device. In some implementations, the device analytics platform may determine a single metric sub-model for a single managed device. This facilitates individual analysis of a managed device in the context of the managed device, thereby facilitating identification of individual issues with individual managed devices, even when the set of managed devices includes hundreds, thousands, or more managed devices. In addition, this facilitates a contextualized analysis of a managed device based on unique patterns, trends, and/or the like of the set of metrics, thereby facilitating more accurate and/or individualized detection of issues across hundreds, thousands, or more managed devices, thereby reducing or eliminating false positive identification of an issue (and subsequent false positive alert generation), and/or the like. Further, this facilitates inter-metric analysis for individual managed devices (e.g., an analysis of a manner in which different metrics are related to each other on an individual managed device basis), thereby improving an analysis of the set of managed devices.

In some implementations, the device analytics platform may determine a metric sub-model based on a kernel density estimation (KDE) model. For example, the device analytics platform may determine a KDE model for a set of metrics associated with a managed device by processing values for the set of metrics using a kernel parameter and a kernel bandwidth parameter. Reference number 112 shows an example of a KDE model that the device analytics platform may generate as a metric sub-model for a managed device.

As shown by reference number 114, the device analytics platform may determine a set of device sub-models. For example, the device analytics platform may determine the set of device sub-models after, or in association with, determining the set of metric sub-models, based on receiving input from a user of the device analytics platform to determine the set of device sub-models, after determining the multi-entity profile, and/or the like. In some implementations, the device analytics platform may determine the device sub-model based on the multi-entity profile. For example, the device analytics platform may use the multi-entity profile (e.g., the manner in which the multi-entity profile organizes the operations data) to determine the set of device sub-models. Continuing with the previous example, the device analytics platform may select, from the multi-entity profile, data associated with a managed device, data that identifies one or more attributes associated with the set of managed devices, and/or the like.

In some implementations, a device sub-model may identify a pattern, a trend, and/or the like for a set of attributes associated with a managed device, similar to a metric sub-model described elsewhere herein. In this way, a device sub-model may identify operational characteristics over time of an attribute, thereby contextualizing the operations data to the attribute. In some implementations, the device analytics platform may determine a single device sub-model for a single attribute, similar to a metric sub-model.

In some implementations, when determining the set of device sub-models, the device analytics platform may group the set of managed devices based on one or more attributes of the set of managed devices (e.g., may group information identifying the set of managed devices based on information identifying one or more attributes of the set of managed devices). For example, the device analytics platform may group the set of managed devices by type of managed device, by age, by brand of managed device, and/or the like. In some implementations, and continuing with the previous example, the device analytics platform may use the operations data for different groupings of managed devices to determine a pattern, a trend, and/or the like for the different groupings of managed devices (e.g., for different attributes of the set of managed devices). This facilitates attribute-specific analysis of operations of the set of managed devices, which improves an accuracy of identifying an issue with a managed device, facilitates an analysis of the operations that is contextualized to the attributes, reduces or eliminates false positive identification of issues, and/or the like.

Additionally, or alternatively, when determining the set of device sub-models, the device analytics platform may generate a multivariate metric model for the set of managed devices. For example, the device analytics platform may generate a multivariate model that uses multivariate analysis of variance, multivariate regression, factor analysis, canonical correlation analysis, and/or the like to analyze operations data for multiple attributes of the set of managed devices, such as to identify relationships between the multiple attributes. This facilitates multiple attribute analysis of operations of the set of managed devices, which improves an accuracy of identifying an issue with a managed device, facilitates an analysis of the operations that is contextualized to the multiple attributes, reduces or eliminates false positive identification of issues, and/or the like when manual review is not otherwise possible due to the quantity of relationships between multiple variables, due to the complexity of the relationships between multiple variables, and/or the like. For example, generating a multivariate metric model may facilitate event correlation (e.g., issue identification across attributes, across managed devices, and/or the like), sequential pattern analyses, device performance analysis, failure prediction, and/or the like for hundreds, thousands, or more attributes. Reference number 116 shows various visualizations of examples of device sub-models that the device analytics platform may determine (discussed below with respect to FIGS. 3A-3C). For example, the various examples may identify values for the set of managed devices for multiple attributes of the set of managed devices, as described elsewhere herein.

Turning to FIG. 1C, and as shown by reference number 118, the device analytics platform may generate a model for the set of metric sub-models and the set of device sub-models. For example, the device analytics platform may generate a model for the set of metric sub-models and the set of device sub-models after determining the set of metric sub-models and/or the set of device sub-models, based on receiving input from a user of the device analytics platform to generate the model, and/or the like. In some implementations, the model may include an isolation forest (e.g., where the operations data is partitioned into randomly selected features and then minimum and maximum values of each feature are selected), a neural network (e.g., where nodes of the neural network are trained and are used to process the operations data), and/or the like that can be used to process the operations data to identify an issue with the operations of the set of managed devices, to determine whether an alert from the device monitoring system is to be suppressed, to determine whether one or more managed devices of the set of managed devices needs to be replaced, and/or the like, as described elsewhere herein.

In some implementations, the device analytics platform may use multiple types of models and may use a combination of unsupervised and supervised machine learning techniques. For example, the device analytics platform may use an isolation forest for unsupervised machine learning and may use a neural network for supervised machine learning. The combination of supervised and unsupervised machine learning may compensate for misalignment between operations data and alerts received from the device management system. For example, the device analytics platform may have difficulty aligning operations data with received alerts from the device management system based on a delay between receiving the operations data and/or the alerts, inaccuracies in time stamps associated with the operations data and the alerts, and/or the like, and the combination of unsupervised and supervised machine learning may compensate for these issues. In this way, the combination may improve an accuracy of training a machine learning model associated with the device analytics platform.

As shown by reference number 120, the device analytics platform may generate the model based on combining the set of metric sub-models and the set of device sub-models into the model. For example, the device analytics platform may combine a set of KDE models, a set of groupings of the set of managed devices, and/or a set of multivariate models into the isolation forest, the neural network, and/or the like.

In some implementations, the device analytics platform may generate the model by training a machine learning model on the set of metric sub-models and/or the set of device sub-models. In some implementations, the device analytics platform may train the machine learning model using the model. The machine learning model may, for example, be similar to that described elsewhere herein.

In some implementations, the device analytics platform may re-train the model based on receiving updated operations data. For example, the device analytics platform may re-train the model in real-time or near real-time (e.g., as the device analytics platform receives updated operations data), periodically, according to a schedule, and/or the like.

As shown by reference number 122, the device analytics platform may determine a score based on output from the model. For example, the device analytics platform may determine a score for a managed device, for operations of the managed device, and/or the like after generating the model, after processing the operations data using the model, and/or the like.

In some implementations, the device analytics platform may determine a separate score for different managed devices, may determine a separate score for different attributes of the set of managed devices, may determine an aggregated score for multiple managed devices (e.g., by attribute, by time period, and/or the like), for multiple attributes (e.g., by time period), and/or the like. In some implementations, a device analytics platform may determine an aggregated score by summing multiple scores, averaging multiple scores, applying weights to different scores, and/or the like.

In some implementations, a score may indicate a quality of operations of a managed device (or of multiple managed devices for an aggregated score). For example, a score may indicate whether a managed device is experiencing an issue with operations of the managed device, whether an alert from the device monitoring system needs to be suppressed, whether a managed device (or a group of managed devices) needs to be replaced, and/or the like.

In some implementations, to determine the score, the device analytics platform may process operations data using the model. For example, the model may process the operations data for a managed device to identify anomalies in the operations data for the managed device (e.g., operations data that satisfies a threshold, that is outside of an expected range, and/or the like) based on historical patterns, trends, and/or the like for the managed device, for particular times of the day or days of the week, for particular functions that the managed device is performing, by attribute of the managed device, and/or the like.

As shown by reference number 124, the model may output the score after the device analytics platform has processed the operations data using the model. Additionally, or alternatively, when the device analytics platform processes the operations data using a machine learning model, the machine learning model may output the score. In some implementations, the score may be an average score, a range of scores, and/or the like. For example, the device analytics platform may perform multiple iterations of processing of the operations data and may generate the score based on the scores associated with the multiple iterations.

In some implementations, the device analytics platform may re-determine and/or re-train the set of metric sub-models, the set of device sub-models, the model, and/or the like based on receiving updated operations data from the set of managed devices and/or new alerts from the device monitoring system. For example, the device analytics platform may re-determine and/or re-train the set of metric sub-models, the set of device sub-models, the model, and/or the like in a manner similar to determining and/or training the set of metric sub-models, the set of device sub-models, the model, and/or the like described elsewhere herein. This improves an accuracy of processing operations data over time as operations data changes, as the device monitoring system is updated to generate alerts in new ways, and/or the like.

As shown by reference number 126, the device analytics platform may perform an action related to suppressing an alert and/or replacing a managed device based on the score. For example, the device analytics platform may perform the action after determining the score, after processing the operations data using the model, based on receiving input from a user of the device analytics platform to perform the action, and/or the like.

In some implementations, the device analytics platform may determine a quality of a managed device based on a score for the managed device. For example, the device analytics platform may determine whether the operations of the managed device include an issue, include an issue of a threshold severity (e.g., based on using information that maps various possible issues in the operations data to a corresponding severity), and/or the like based on the score. Additionally, or alternatively, and as another example, the device analytics platform may perform a time-series analysis of scores for the operations over time to determine whether a pattern, a trend, and/or the like of the scores indicates an issue.

In some implementations, the device analytics platform may generate a recommendation related to one or more managed devices of the set of managed devices and/or related to one or more alerts generated by the device monitoring system based on the score. For example, the device analytics platform may generate a recommendation to replace the one or more managed devices, to power down the one or more managed devices, to power on one or more additional managed devices, and/or the like. Additionally, or alternatively, and as another example, the device analytics platform may generate a recommendation to suppress an alert, to assign an alert a particular priority (e.g., a high priority, a medium priority, or a low priority), to direct the alert to a particular individual associated with the organization (e.g., to a device or an account associated with the individual), such as based on the priority of the alert, and/or the like.

In some implementations, the device analytics platform may generate a work order based on the score and may provide the work order to a device and/or an account associated with an individual. For example, the device analytics platform may generate a work order to repair and/or to replace one or more managed devices of the set of managed devices. Additionally, or alternatively, the device analytics platform may send a set of instructions to the one or more managed devices to power down. Additionally, or alternatively, the device analytics platform may send a set of instructions to one or more other managed devices to power on and/or to boot up. Additionally, or alternatively, the device analytics platform may cause software updates or new software to be downloaded and/or installed on one or more of the managed devices.

In some implementations, the device analytics platform may prevent one or more alerts from being sent to an intended destination (e.g., a device and/or an account associated with a network technician and/or an administrator). For example, the device analytics platform may be an intermediary between the device monitoring system and the intended destination and may suppress the one or more alerts from being sent to the intended destination. Additionally, or alternatively, the device analytics platform may send one or more alerts (or allow one or more alerts to be sent) to an intended destination. Additionally, or alternatively, the device analytics platform may generate a log of whether an alert was sent to an intended destination (e.g., in a data structure that includes information that identifies the alert, a timestamp for the alert and/or suppression of the alert, and/or the like).

Additionally, or alternatively, the device analytics platform may send a set of instructions to the device monitoring system to modify a manner in which the device monitoring system generates alerts. For example, the device analytics platform may send a set of instructions to modify one or more thresholds used by the device monitoring system, to modify metrics that the device monitoring system uses to track operations of the set of managed devices, to modify a manner in which alerts from the device monitoring system are triggered (e.g., may modify an amount of time that the device monitoring system has to detect an issue before generating an alert), and/or the like.

In this way, the device analytics platform may reduce or eliminate false positive alert generation related to operations of a set of managed devices, may facilitate replacement of one or more managed devices of the set of managed devices, and/or the like. This improves detection and/or fixing of issues in operations of the set of managed devices, thereby reducing or eliminating delay related to detection and/or fixing of the issues. In addition, this reduces or eliminates false positive alert generation, thereby conserving computing resources that would otherwise be consumed as a result of the false positive alert generation. Further, this improves functioning of a set of managed devices associated with an organization, thereby improving communications via the set of managed devices. Moreover, this facilitates more efficient prioritization of managed devices for replacement and/or updating relative to other techniques.

As indicated above, FIGS. 1A-1C are provided merely as an example. Other examples may differ from what was described with regard to FIGS. 1A-1C. Although some implementations were described as using particular types of models, such as a KDE model, a neural network, and/or the like, the implementations apply equally to other types of models, such as a k-means clustering model, a random forest model, and/or the like.

Figure 2:
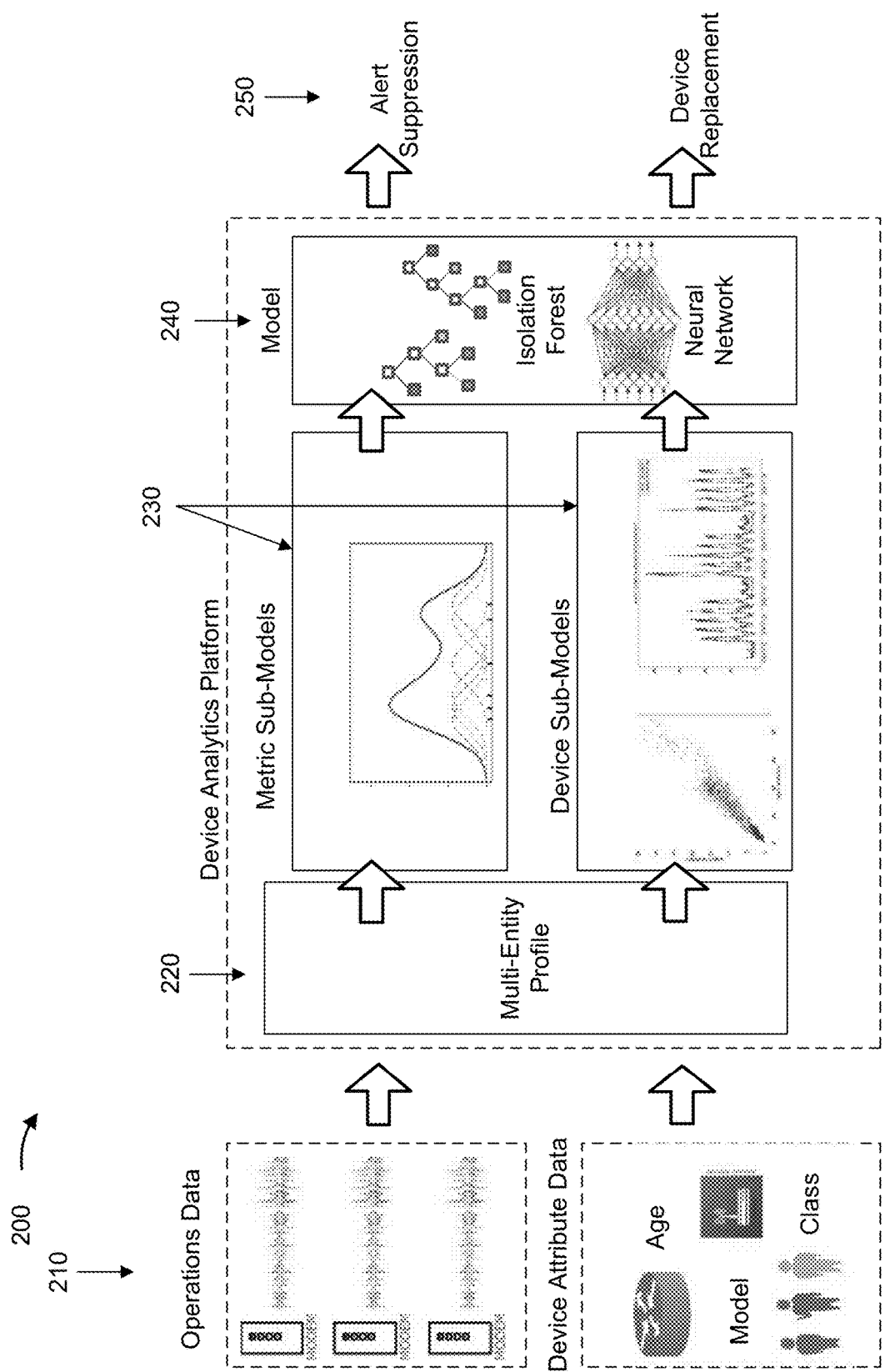

FIG. 2 is a diagram of an example implementation 200 described herein. As shown in FIG. 2, implementation 200 includes a device analytics platform. As shown by reference number 210, the device analytics platform may receive operations data related to operations of a set of managed devices. Additionally, or alternatively, and as further shown by reference number 210, the device analytics platform may receive device attribute data related to a set of attributes of the set of managed devices. In some implementations, the device analytics platform may receive the operations data and/or the device attribute data in a manner that is the same as or similar to that described elsewhere herein.

As shown by reference number 220, the device analytics platform may determine a multi-entity profile for the operations data and/or the device attribute data. For example, the device analytics platform may determine the multi-entity profile after receiving the operations data and/or the device attribute data in a manner that is the same as or similar to that described elsewhere herein. In some implementations, the device analytics platform may determine a multi-entity profile based on the operations data, such as by grouping the operations data by managed device, by time period, by metric, and/or the like. Additionally, or alternatively, the device analytics platform may determine a multi-entity profile based on the device attribute data, such as by grouping the device attribute data by managed device, by attribute, by time period, and/or the like.

As shown by reference number 230, the device analytics platform may determine a set of metric sub-models and a set of device sub-models. For example, the device analytics platform may determine the set of metric sub-models and/or the set of device sub-models after determining the multi-entity profile in a manner that is the same as or similar to that described elsewhere herein. In some implementations, the device analytics platform may determine the set of metric sub-models based on the operations data and/or the device attribute data. Additionally, or alternatively, the device analytics platform may determine the set of device sub-models based on the operations data and/or the device attribute data.

As shown by reference number 240, the device analytics platform may generate a model. For example, the device analytics platform may generate a model based on the set of metric sub-models and/or the set of device sub-models after generating the set of metric sub-models and/or the set of device sub-models in a manner that is the same as or similar to that described elsewhere herein. In some implementations, the device analytics platform may generate an isolation forest based on the set of metric sub-models and/or the set of device sub-models (e.g., by generating decision trees of the isolation forest from the set of metric sub-models and/or the set of device sub-models), may generate a neural network based on the set of metric sub-models and/or the set of device sub-models (e.g., may train nodes of the neural network on the set of metric sub-models and/or the set of device sub-models), and/or the like.

As shown by reference number 250, the device analytics platform may perform one or more actions related to output from the model. For example, the device analytics platform may perform one or more actions related to alert suppression. Continuing with the previous example, the device analytics platform may prevent an alert generated by a device monitoring system from being sent to an intended destination. Additionally, or alternatively, and as another example, the device analytics platform may perform one or more actions related to device replacement. Continuing with the previous example, the device analytics platform may generate a work order to replace one or more managed devices of the set of managed devices.

FIG. 2 is provided merely as an example. Other examples may differ from what was described with regard to FIG. 2.

Figure 3A:
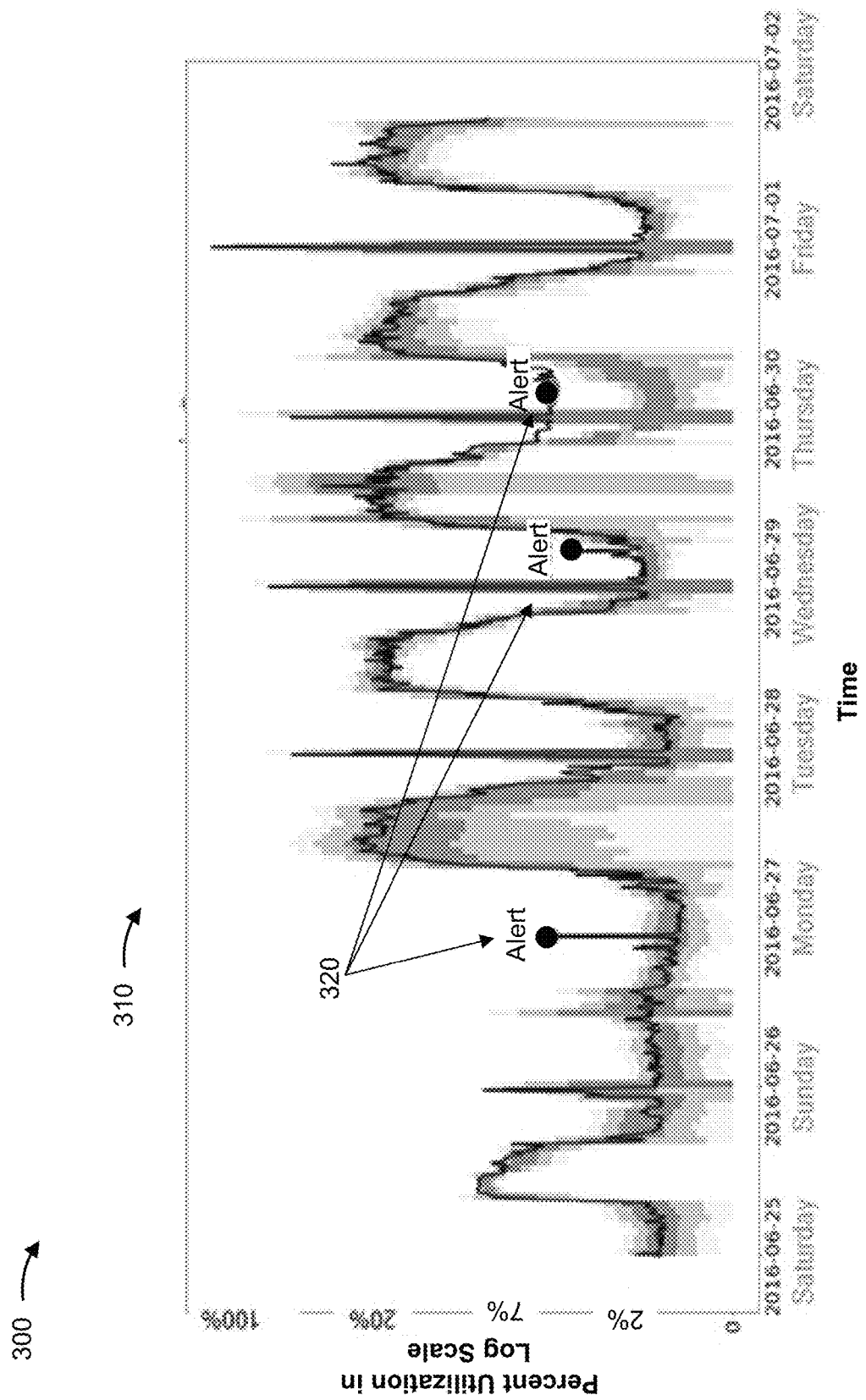
Figure 3B:
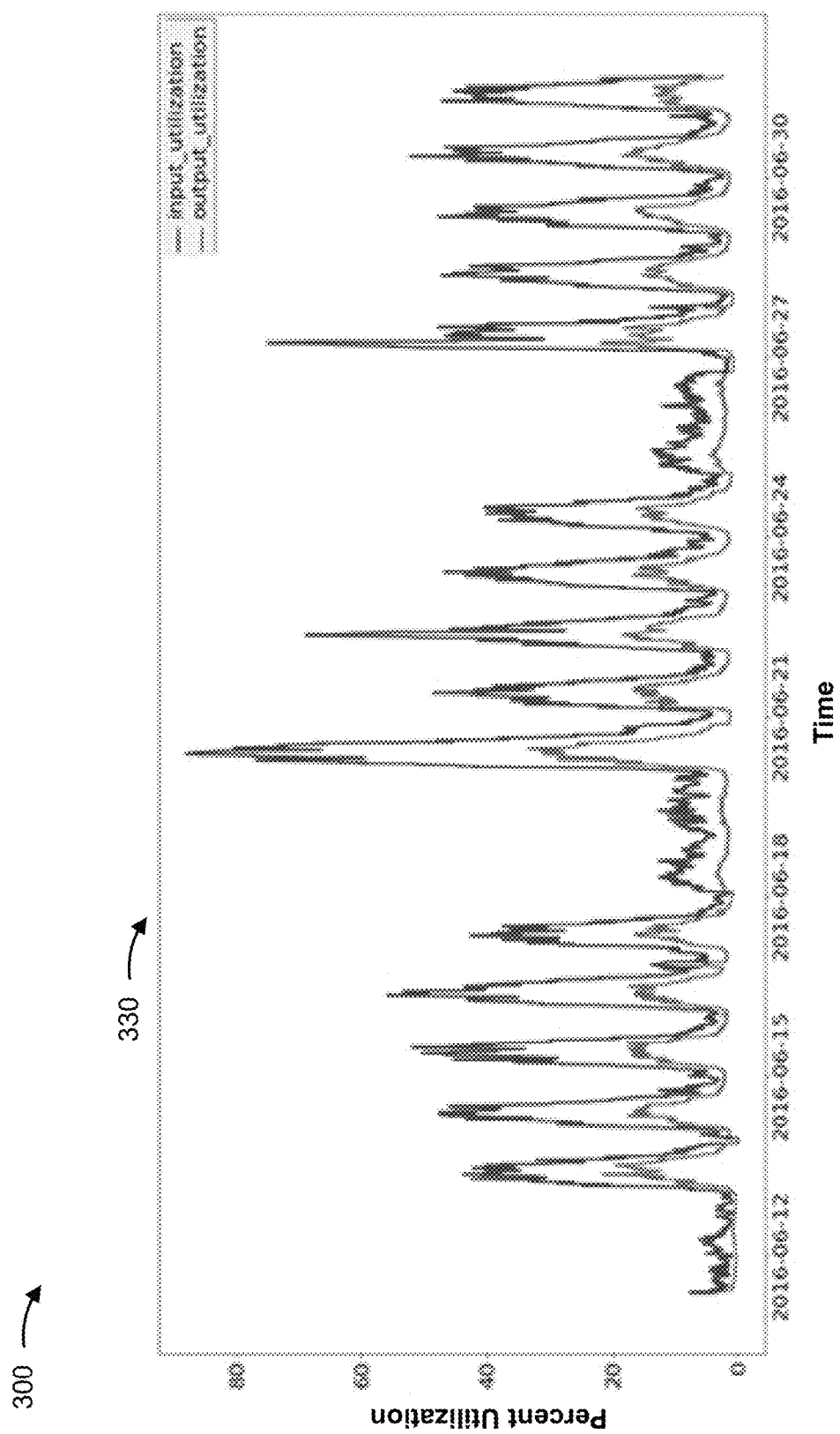
Figure 3C:
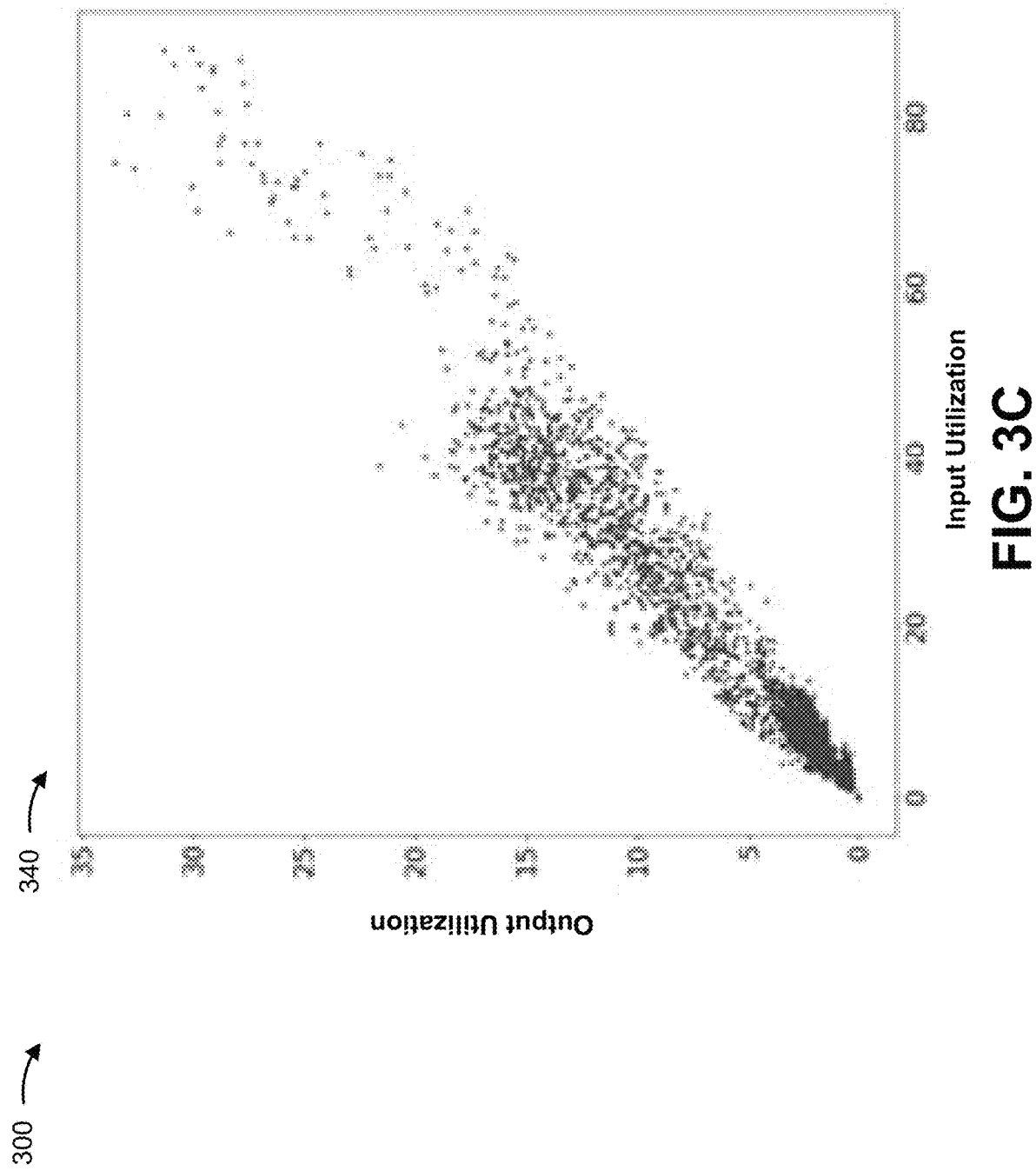

FIGS. 3A-3C are diagrams of one or more example implementations 300 described herein. FIGS. 3A-3C shows various example analyses that a device analytics platform may perform and/or models that the device analytics platform may generate.

FIG. 3A shows a plot 310 of a percent utilization (e.g., an input utilization, an output utilization, a CPU utilization, and/or the like) of a managed device over time. In some implementations, the device analytics platform may perform an analysis of data shown in plot 310, such as to determine whether to suppress an alert, whether to replace a managed device, and/or the like. In some implementations, the device analytics platform may perform the analysis in a contextualized manner, such as based on attributes of the managed device, based on historical operations of the managed device, and/or the like. As shown by reference number 320, the device analytics platform may suppress or not suppress various alerts associated with operations of the managed device. For example, the alerts may be associated with abnormal utilization of the managed device.

In some implementations, the device analytics platform may use the data shown in FIG. 3A to perform an analysis of the alerts based on dynamic thresholding. For example, the device analytics platform may perform an analysis of data that triggered an alert in the context of other data associated with a managed device, such as to determine whether the data at the time the alert was generated is abnormal in the context of data at other times around the time the alert was generated.

FIG. 3B shows a plot 330 of a comparison of an input utilization and an output utilization of a managed device (e.g., a percent utilization of the input utilization and of the output utilization) over time. In some implementations, the device analytics platform may use the data shown in plot 330 to generate a device sub-model, such as a multivariate model. In some implementations, the device analytics platform may utilize the data shown in plot 330 to prioritize alerts generated by the device monitoring system (e.g., a prioritization for analyzing the alerts, for addressing the alerts, and/or the like).

FIG. 3C shows a plot 340 of an output utilization versus an input utilization of multiple managed devices. For example, the device analytics platform may use the data (e.g., percent utilization in terms of the output utilization versus the input utilization) shown in plot 340 to determine a correlation between the output utilization and the input utilization, such as to model a relationship between the output utilization and the input utilization. In some implementations, the device analytics platform may use the data shown in plot 340 for a multivariate analysis, a high density KDE, a principle component analysis, and/or the like.

Although FIGS. 3A-3C are described in the context of particular metrics, the implementations apply similarly to other metrics described herein.

FIGS. 3A-3C are provided merely as an example. Other examples may differ from what was described with regard to FIG. 3A-3C.

Figure 4A:
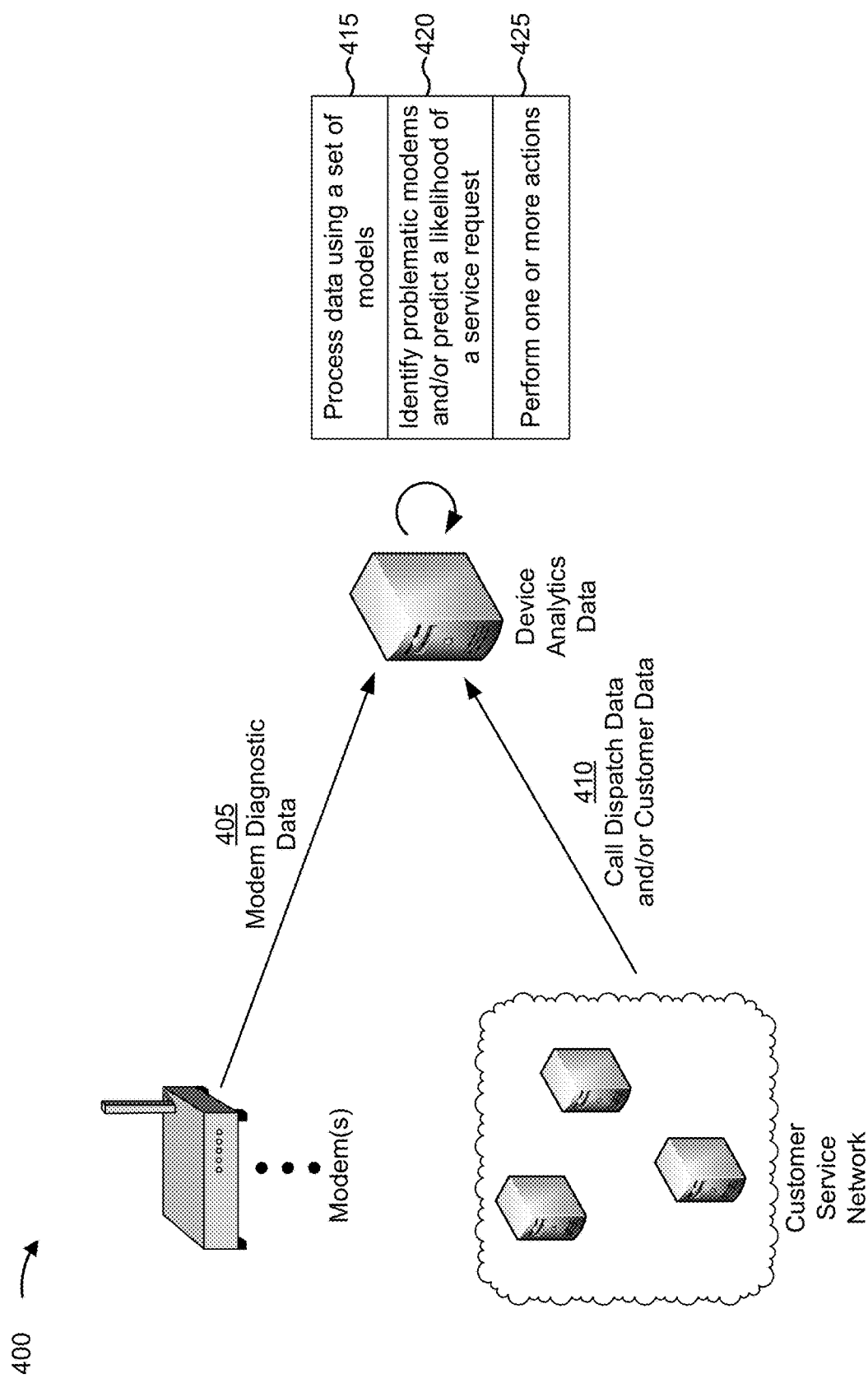
Figure 4B:
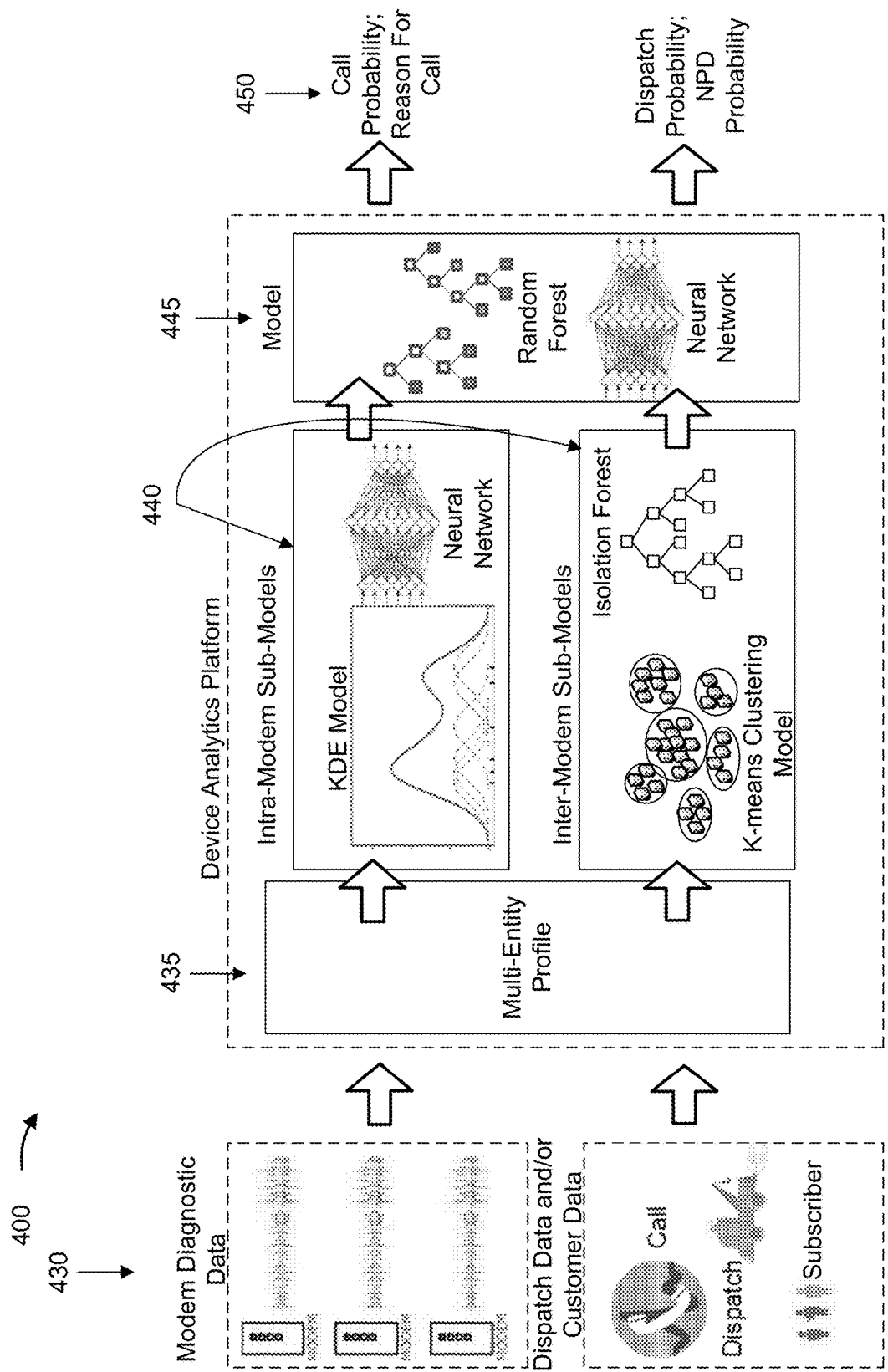

FIGS. 4A-4B are diagrams of one or more example implementations 400 described herein. FIG. 4A shows an example of processing data related to a set of devices to identify one or more problematic devices and/or to predict a likelihood of the one or more devices needing to be serviced. As shown in FIG. 4A, implementation 400 includes a set of modems (or other network devices), a customer service network, and a device analytics platform.

As shown by reference number 405, the device analytics platform may receive modem diagnostic data. For example, the device analytics platform may receive the modem diagnostic data from the set of modems periodically, according to a schedule, based on requesting the modem diagnostic data from the set of modems, in real-time or near real-time, and/or the like. In some implementations, the modem diagnostic data may identify uptime for the set of modems, a data rate of the set of modems, a bandwidth used by the set of modems, and/or the like. Additionally, or alternatively, and as another example, the modem diagnostic data may include operations data similar to that described elsewhere herein. For example, the modem diagnostic data may identify metrics related to operations of the set of modems, attributes of the set of modems, and/or the like.

As shown by reference number 410, the device analytics platform may receive call dispatch data and/or customer data. For example, the device analytics platform may receive the call dispatch data and/or the customer data in association with receiving the modem diagnostic data, periodically, according to a schedule, based on requesting the call dispatch and/or customer data from the customer service network, in real-time or near real-time, and/or the like. In some implementations, the call dispatch data may identify historical issues for the set of modems, solutions for the historical issues, service histories for the set of modems, and/or the like associated with various customers (e.g., may include call data related to service calls, dispatch data related to service dispatches, and/or a combination of call data and dispatch data). In some implementations, the customer data may identify a location of a customer, a service level associated with a customer, a value of products and/or services purchased by a customer, a quantity of times that a customer has contacted a customer service department associated with the set of modems for the same issue and/or for different issues, issues that a customer has reported to a customer service department, and/or the like.

Additionally, or alternatively, the modem diagnostic data, the call dispatch data, and/or the customer data may include session call data that identifies a log of customer calls during a time period (e.g., that includes a subscriber identifier that identifies a customer associated with a customer call, information that identifies a date and/or time for a customer call, information that identifies a call duration of a customer call, information that identifies a call reason for a customer call, and/or the like). Additionally, or alternatively, the modem diagnostic data, the call dispatch data, and/or the customer data may include data that identifies a log of dispatches for a time period (e.g., the same time period as the session call data), that identifies information about whether a dispatch is productive (e.g., resolves an issue), and/or the like. Additionally, or alternatively, the modem diagnostic data, the call dispatch data, and/or the customer data may include subscriber data that identifies information for a subscriber at a particular time, that can be used to determine a customer churn date (e.g., a service disconnection date), and/or the like. Additionally, or alternatively, the modem diagnostic data, the call dispatch data, and/or the customer data may include modem master data that identifies a device identifier for a modem, a type of a modem, a subscriber identifier associated with a modem, and/or the like.

As shown by reference number 415, the device analytics platform may process data using a set of models. For example, the device analytics platform may process the modem diagnostic data, the call dispatch data, and/or the customer data using a set of models after receiving the modem diagnostic data, the call dispatch data, and/or the customer data, based on receiving input from a user of the device analytics platform, and/or the like. In some implementations, the device analytics platform may process the data using a set of models similar to that described elsewhere herein (e.g., a set of metric sub-models, a set of device sub-models, a model generated from the set of metric sub-models and/or the set of device sub-models, and/or the like).

As shown by reference number 420, the device analytics platform may identify problematic modems, of the set of modems, and/or may predict a likelihood of a service request for one or more modems of the set of modems. For example, the device analytics platform may identify problematic modems and/or may predict a likelihood of a service request for the set of modems after processing the data using the set of models, based on receiving input from a user of the device analytics platform, and/or the like.

In some implementations, the device analytics platform may determine respective scores for the set of modems based on output from the set of models in a manner similar to that described elsewhere herein. For example, a score may identify a quality of operations of a modem, which may indicate that the modem is a problematic modem, may identify a likelihood that a modem will need a service request, a severity of an issue associated with a modem, a likelihood that a modem will need a service request within a particular amount of time, and/or the like.

In some implementations, the device analytics platform may identify problematic modems of the set of modems based on the respective scores. For example, the device analytics platform may identify problematic modems based on whether the respective scores satisfy a threshold, whether the respective scores are within a range of values, a pattern of the respective scores over time, a trend of the respective scores over time, and/or the like. In some implementations, the device analytics platform may predict a likelihood of a service request for the set of modems in a similar manner.

As shown by reference number 425, the device analytics platform may perform one or more actions. In some implementations, the device analytics platform may receive a service request telephone call related to a modem (e.g., a telephone number associated with the service request telephone call may be associated with the modem, account information and/or a modem identifier may have been input to a telephone associated with the service request telephone call, and/or the like) and may determine a priority for the service request telephone call based on a score for the modem. For example, the score may indicate a likelihood of the modem needing to be serviced and/or whether the modem is a problematic modem, and the device analytics platform may determine a priority for the service request telephone call based on the score (e.g., a high priority, a medium priority, or a low priority).

In some implementations, the device analytics platform may transfer, based on the priority, the service request telephone call to a telephone associated with a customer service representative, an interactive voice response (IVR) system, and/or the like. For example, the device analytics platform may transfer a high priority service request telephone call to the telephone, may transfer a medium priority service request telephone call to the IVR system, may cause a recorded message directing an individual associated with a low priority service request call to a web portal, and/or the like. In some implementations, the device analytics platform may send a message to a network technician, or another individual (e.g., to a device or an account associated with the network technician), to dispatch the network technician to a location of a modem associated with a service request telephone call, based on the priority. For example, the device analytics platform may send a message, such as a work order, to the network technician based on the priority.

In some implementations, the device analytics platform may send different messages for different priority service request telephone calls. For example, the device analytics platform may send a message configured to cause a pop-up notification to be displayed on a display associated with a device associated with the network technician for a high priority service request telephone call, may send a message that is added to an account inbox for a medium priority or a low priority service request call, and/or the like. In some implementations, the device analytics platform may schedule a servicing for the modem. For example, the device analytics platform may access electronic calendars associated with an individual associated with the modem and a network technician to identify an available time for the servicing and may generate a calendar item (e.g., a calendar meeting, a calendar event, and/or the like) on the electronic calendars for the servicing.

This improves an efficiency of managing incoming service request telephone calls via efficient and/or accurate prioritization of the incoming service request telephone calls. In addition, this reduces costs associated with servicing incoming service request telephone calls. Further, this reduces a quantity of dispatches related to service requests, thereby conserving time, costs, fuel (e.g., of a vehicle), and/or the like, that would otherwise be consumed dispatching a technician to a service request. Further, this improves a customer satisfaction and/or reduces or eliminates repeat service request telephone calls via efficient and/or accurate prioritization of service request telephone calls.

FIG. 4B shows another example of processing data related to a set of devices to identify one or more problematic devices and/or to predict a likelihood of one or more devices needing to be serviced. As shown by reference number 430, the device analytics platform may receive modem diagnostic data, dispatch data, and/or customer data.

In some implementations, the modem diagnostic data, dispatch data, and/or customer data may be similar to that described elsewhere herein and the device analytics platform may receive the modem diagnostic data, dispatch data, and/or customer data in a manner that is similar to that described elsewhere herein.

As shown by reference number 435, the device analytics platform may determine a multi-entity profile for the modem diagnostic data, dispatch data, and/or customer data. In some implementations, the device analytics platform may determine the multi-entity profile in a manner that is similar to that described elsewhere herein. In some implementations, the multi-entity profile may be stored in a data structure that stores the modem diagnostic data, dispatch data, and/or customer data organized in the manner described elsewhere herein. In some implementations, the multi-entity profile may be updated in the data structure and/or obtained from the data structure in real-time or near real-time, in batch, and/or the like. In some implementations, the manner in which the multi-entity profile is stored may facilitate determination of metrics from the modem diagnostic data, dispatch data, and/or customer data, identification of features and/or patterns in the modem diagnostic data, dispatch data, and/or customer data, use of probabilities, statistics, hypothesis testing, and/or the like with regard to the modem diagnostic data, dispatch data, and/or customer data, and/or the like.

As shown by reference number 440, the device analytics platform may include a set of intra-modem sub-models and a set of inter-modem sub-models, such as to process the multi-entity profile. For example, the set of intra-modem sub-models and the set of inter-modem sub-models may be similar to other models described elsewhere herein.

In some implementations, the set of intra-modem sub-models may be related to analyzing data related to a specific modem, such as to determine features of the data related to the modem, to determine relationships among various metrics determined from the data, and/or the like. For example, the set of intra-modem sub-models may include a KDE model similar to that described elsewhere herein. Continuing with the previous example, the KDE model may include a non-parametric model to estimate a probability distribution for a metric. Additionally, or alternatively, and as another example, the set of intra-modem sub-models may include a neural network similar to that described elsewhere herein. Continuing with the previous example, the neural network may combine and/or process features of the modem diagnostic data, dispatch data, and/or customer data, may analyze non-linear relationships among the modem diagnostic data, dispatch data, and/or customer data, and/or output a score (as described elsewhere herein).

In some implementations, the set of inter-modem sub-models may be related to grouping different modems by modem diagnostic data, dispatch data, and/or customer data, identifying anomalies among groups of modems, and/or the like. For example, the set of inter-modem sub-models may include a k-means clustering model to group modems based on metrics determined from the modem diagnostic data, dispatch data, and/or customer data. Additionally, or alternatively, and as another example, the set of inter-modem sub-models may include an isolation forest model similar to that described elsewhere herein. Continuing with the previous example, the isolation forest model may be related to detecting anomalies and/or outliers in modem operation.

As shown by reference number 445, the device analytics platform may include a model that is trained on and/or combines outputs of the set of intra-modem sub-models and the set of inter-modem sub-models, such as to determine a score similar to that described elsewhere herein. For example, the model may include a random forest model, a neural network model, and/or the like. As shown by reference number 450, the device analytics platform may output a call probability score (e.g., that identifies a likelihood of a modem being associated with a service call), a reason for a service call (e.g., a likely reason for the service call), a dispatch probability score (e.g., that identifies a likelihood that a technician will need to be dispatched to a location of the modem), a non-productive dispatch (NPD) probability score (e.g., that identifies a likelihood that the dispatched technician will be unsuccessful in resolving an issue that prompted the service call), and/or the like.

In this way, the device analytics platform provides a tool that can be used to easily and quickly utilize big data and/or machine learning techniques in day-to-day operations of an organization. This increases a usability of big data and/or machine learning techniques relative to not using the device analytics platform. In addition, this facilitates use of big data and/or machine learning techniques in real-time or near real-time, for batch processing, and/or the like.

FIGS. 4A-4B are provided merely as an example. Other examples may differ from what was described with regard to FIGS. 4A-4B. For example, although FIGS. 4A-4B were described in the context of a set of modems, the implementations apply equally to other types of devices, such as other network devices (e.g., routers), client devices, server devices, and/or the like.

Figure 5:
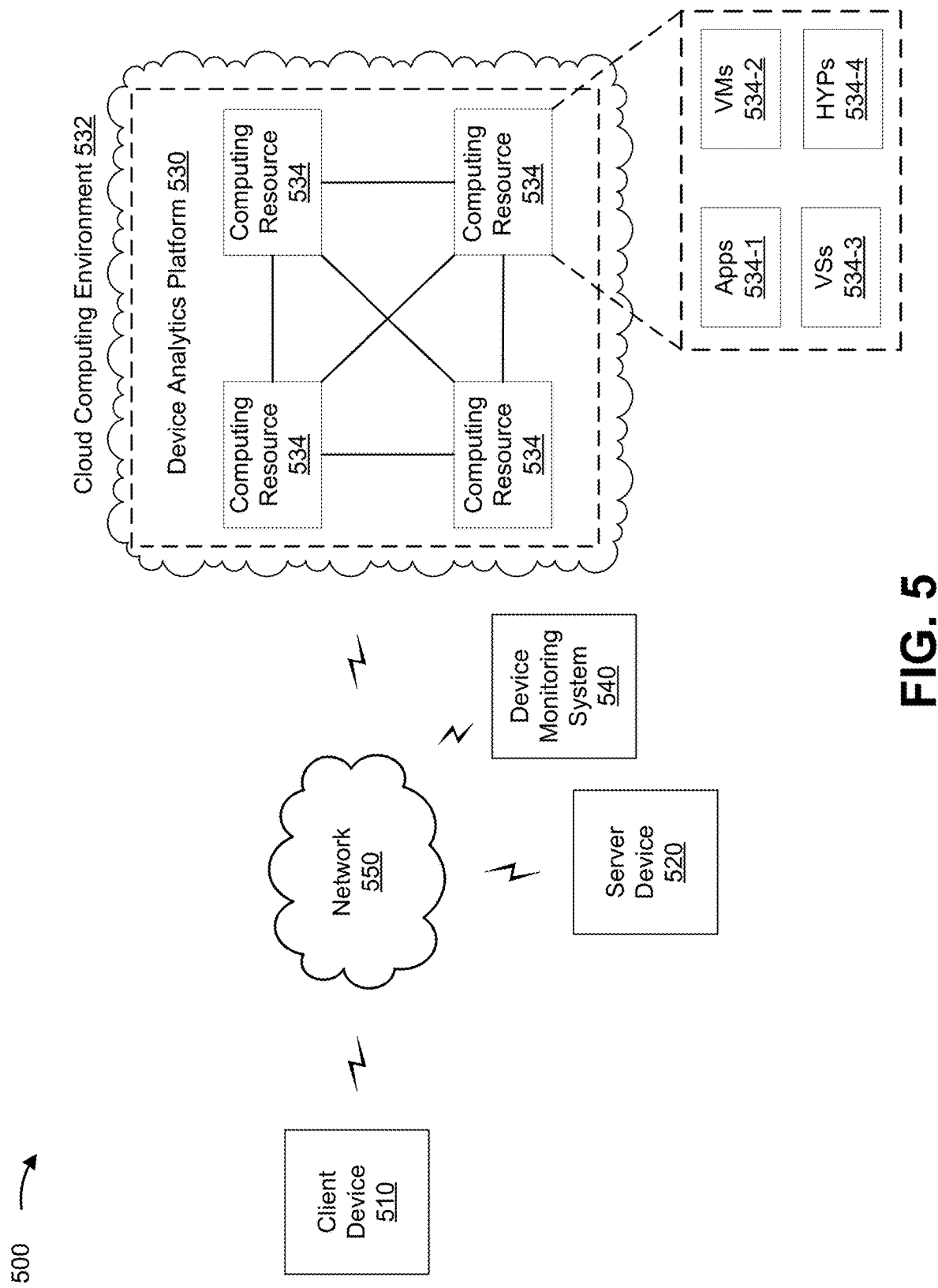
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a client device 510, a server device 520, a device analytics platform 530 hosted within a cloud computing environment 532 that includes a set of computing resources 534, and a network 550. Devices of environment 500 may interconnect via wired connections, wireless connections, or a combination of wired and wireless connections.

Client device 510 includes one or more devices capable of receiving, generating, storing, processing, and/or providing data associated with operations of a managed device. For example, client device 510 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 510 may provide, to device analytics platform 530, information related to causing device analytics platform 530 to process operations data of a managed device, as described elsewhere herein.

Server device 520 includes one or more devices capable of receiving, generating storing, processing, and/or providing data associated with operations of a set of managed devices. For example, server device 520 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 520 may include a communication interface that allows server device 520 to receive information from and/or transmit information to other devices in environment 500. In some implementations, server device 520 may be a physical device implemented within a housing, such as a chassis. In some implementations, server device 520 may be a virtual device implemented by one or more computer devices of a cloud computing environment or a data center. In some implementations, server device 520 may provide, to device analytics platform 530, operations data to be processed by device analytics platform 530, as described elsewhere herein.

Device analytics platform 530 includes one or more devices capable of receiving, generating, storing, processing, and/or providing operations data associated with a managed device. For example, device analytics platform 530 may include a cloud server or a group of cloud servers. In some implementations, device analytics platform 530 may be designed to be modular such that certain software components can be swapped in or out depending on a particular need. As such, device analytics platform 530 may be easily and/or quickly reconfigured for different uses.

In some implementations, as shown in FIG. 5, device analytics platform 530 may be hosted in cloud computing environment 532. Notably, while implementations described herein describe device analytics platform 530 as being hosted in cloud computing environment 532, in some implementations, device analytics platform 530 may be non-cloud-based (i.e., may be implemented outside of a cloud computing environment) or may be partially cloud-based.

Cloud computing environment 532 includes an environment that hosts device analytics platform 530. Cloud computing environment 532 may provide computation, software, data access, storage, and/or other services that do not require end-user knowledge of a physical location and configuration of a system and/or a device that hosts device analytics platform 530. As shown, cloud computing environment 532 may include a group of computing resources 534 (referred to collectively as "computing resources 534" and individually as "computing resource 534").

Computing resource 534 includes one or more personal computers, workstation computers, server devices, or another type of computation and/or communication device. In some implementations, computing resource 534 may host device analytics platform 530. The cloud resources may include compute instances executing in computing resource 534, storage devices provided in computing resource 534, data transfer devices provided by computing resource 534, etc. In some implementations, computing resource 534 may communicate with other computing resources 534 via wired connections, wireless connections, or a combination of wired and wireless connections.

As further shown in FIG. 5, computing resource 534 may include a group of cloud resources, such as one or more applications ("APPs") 534-1, one or more virtual machines ("VMs") 534-2, one or more virtualized storages ("VSs") 534-3, or one or more hypervisors ("HYPs") 534-4.

Application 534-1 includes one or more software applications that may be provided to or accessed by one or more devices of environment 500. Application 534-1 may eliminate a need to install and execute the software applications on devices of environment 500. For example, application 534-1 may include software associated with device analytics platform 530 and/or any other software capable of being provided via cloud computing environment 532. In some implementations, one application 534-1 may send/receive information to/from one or more other applications 534-1, via virtual machine 534-2. In some implementations, application 534-1 may include a software application associated with one or more databases and/or operating systems. For example, application 534-1 may include an enterprise application, a functional application, an analytics application, and/or the like.

Virtual machine 534-2 includes a software implementation of a machine (e.g., a computer) that executes programs like a physical machine. Virtual machine 534-2 may be either a system virtual machine or a process virtual machine, depending upon use and degree of correspondence to any real machine by virtual machine 534-2. A system virtual machine may provide a complete system platform that supports execution of a complete operating system ("OS"). A process virtual machine may execute a single program, and may support a single process. In some implementations, virtual machine 534-2 may execute on behalf of a user (e.g., a user of client device 510), and may manage infrastructure of cloud computing environment 532, such as data management, synchronization, or long-duration data transfers.

Virtualized storage 534-3 includes one or more storage systems and/or one or more devices that use virtualization techniques within the storage systems or devices of computing resource 534. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 534-4 provides hardware virtualization techniques that allow multiple operating systems (e.g., "guest operating systems") to execute concurrently on a host computer, such as computing resource 534. Hypervisor 534-4 may present a virtual operating platform to the guest operating systems, and may manage the execution of the guest operating systems. Multiple instances of a variety of operating systems may share virtualized hardware resources.

Device monitoring system 540 includes one or more devices capable of receiving, generating, storing, processing, and/or providing operations data associated with a managed device. For example, device monitoring system 540 may include an infrastructure monitoring system, a monitoring system, or a similar type of system. In some implementations, device monitoring system 540 may provide, to device analytics platform 530, an alert generated by device monitoring system 540 related to operations of a managed device, as described elsewhere herein.

Network 550 includes one or more wired and/or wireless networks. For example, network 550 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
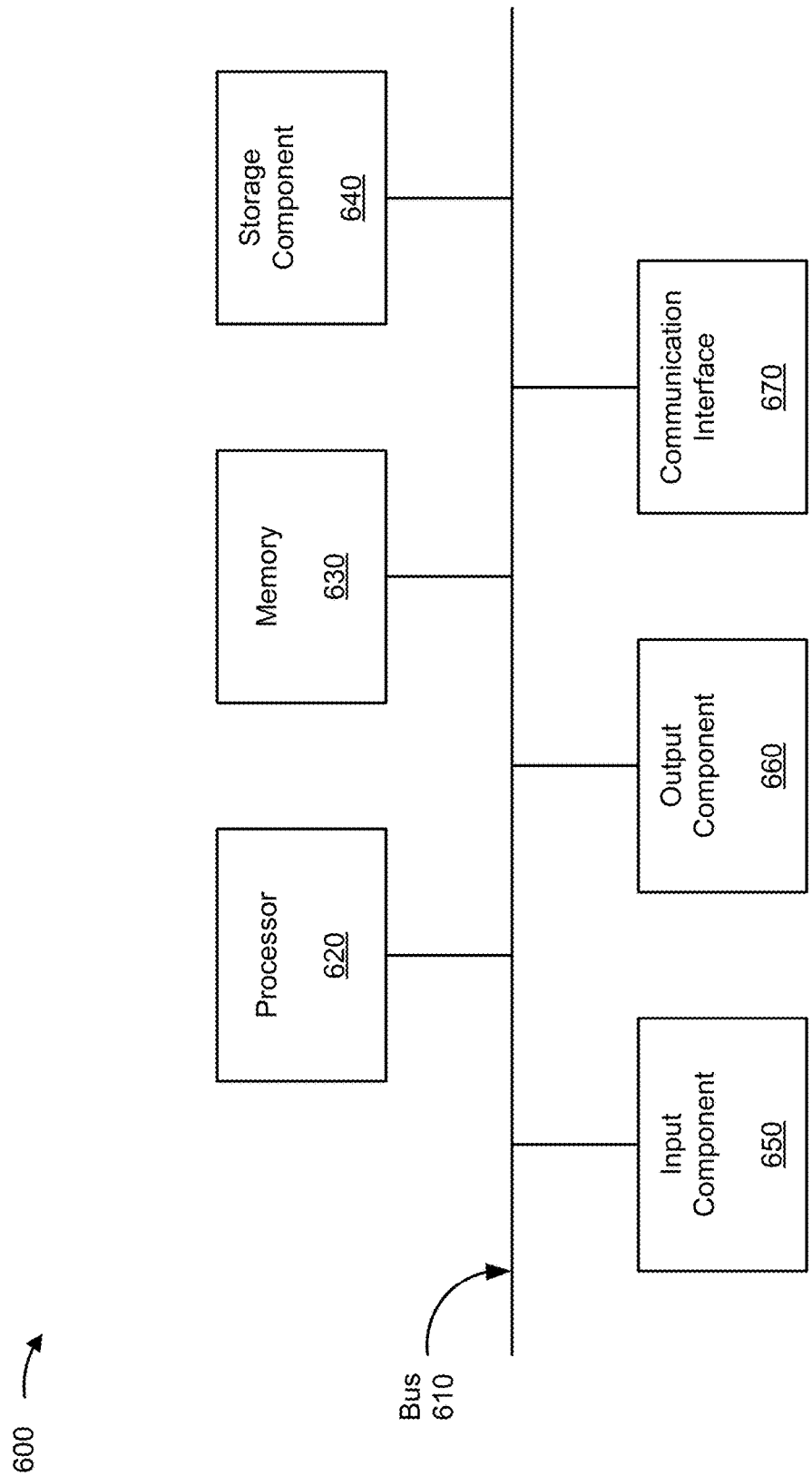
FIG. 6 is a diagram of example components of one or more devices of FIG. 5.

FIG. 6 is a diagram of example components of a device 600. Device 600 may correspond to client device 510, server device 520, device analytics platform 530, computing resource 534, and/or device monitoring system 540. In some implementations, client device 510, server device 520, device analytics platform 530, computing resource 534, and/or device monitoring system 540 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
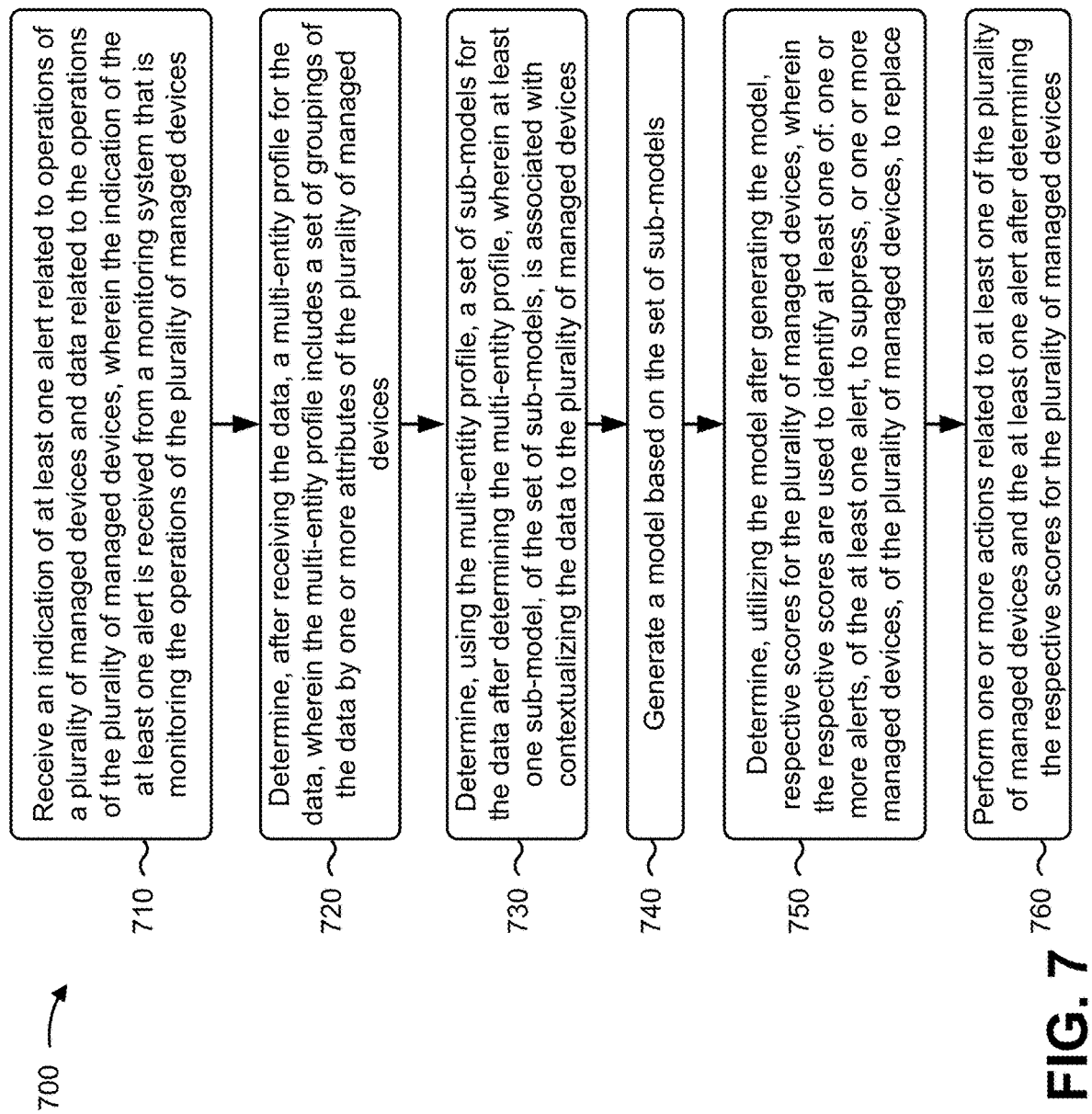

FIG. 7 is a flow chart of an example process 700 for analyzing device-related data to generate and/or suppress device-related alerts. In some implementations, one or more process blocks of FIG. 7 may be performed by a device analytics platform (e.g., device analytics platform 530). In some implementations, one or more process blocks of FIG. 7 may be performed by another device or a group of devices separate from or including the device analytics platform, such as a client device (e.g., client device 510), a server device (e.g., server device 520), a computing resource (e.g., computing resource 534), a device monitoring system (e.g., device monitoring system 540), and/or the like.

As shown in FIG. 7, process 700 may include receiving an indication of at least one alert related to operations of a plurality of managed devices and data related to the operations of the plurality of managed devices, wherein the indication of the at least one alert is received from a monitoring system that is monitoring the operations of the plurality of managed devices (block 710). For example, the device analytics platform (e.g., using computing resource 534, processor 620, input component 650, communication interface 670, and/or the like) may receive an indication of at least one alert related to operations of a plurality of managed devices and data related to the operations of the plurality of managed devices, as described above. In some implementations, the indication of at least one alert is received from a monitoring system that is monitoring the operations of the plurality of managed devices.

As further shown in FIG. 7, process 700 may include determining, after receiving the data, a multi-entity profile for the data, wherein the multi-entity profile includes a set of groupings of the data by one or more attributes of the plurality of managed devices (block 720). For example, the device analytics platform (e.g., using computing resource 534, processor 620, and/or the like) may determine, after receiving the data, a multi-entity profile for the data, as described above. In some implementations, the multi-entity profile includes a set of groupings of the data by one or more attributes of the plurality of managed devices.

As further shown in FIG. 7, process 700 may include determining, using the multi-entity profile, a set of sub-models for the data after determining the multi-entity profile, wherein at least one sub-model, of the set of sub-models, is associated with contextualizing the data to the plurality of managed devices (block 730). For example, the device analytics platform (e.g., using computing resource 534, processor 620, and/or the like) may determine, using the multi-entity profile, a set of sub-models for the data after determining the multi-entity profile, as described above. In some implementations, at least one sub-model, of the set of sub-models, is associated with contextualizing the data to the plurality of managed devices.

As further shown in FIG. 7, process 700 may include generating a model based on the set of sub-models (block 740). For example, the device analytics platform (e.g., using computing resource 534, processor 620, and/or the like) may generate a model based on the set of sub-models, as described above.

As further shown in FIG. 7, process 700 may include determining, utilizing the model after generating the model, respective scores for the plurality of managed devices, wherein the respective scores are used to identify at least one of: one or more alerts, of the at least one alert, to suppress, or one or more managed devices, of the plurality of managed devices, to replace (block 750). For example, the device analytics platform (e.g., using computing resource 534, processor 620, and/or the like) may determine, utilizing the model after generating the model, respective scores for the plurality of managed devices, as described above. In some implementations, the respective scores are used to identify at least one of: one or more alerts, of the at least one alert, to suppress, or one or more managed devices, of the plurality of managed devices, to replace.

As further shown in FIG. 7, process 700 may include performing one or more actions related to at least one of the plurality of managed devices and the at least one alert after determining the respective scores for the plurality of managed devices (block 760). For example, the device analytics platform (e.g., using computing resource 534, processor 620, memory 630, storage component 640, output component 660, communication interface 670, and/or the like) may perform one or more actions related to at least one of the plurality of managed devices and the at least one alert after determining the respective scores for the plurality of managed devices, as described above.

Process 700 may include additional implementations, such as any single implementation or any combination of implementations described below and/or in connection with one or more other processes described elsewhere herein.

In some implementations, the plurality of managed devices includes a plurality of network devices. In some implementations, the device analytics platform may process the multi-entity profile using a kernel density estimation (KDE) model after determining the multi-entity profile; and may determine a set of metric sub-models, of the set of sub-models, based on processing the multi-entity profile using the KDE model.

In some implementations, the device analytics platform may group the plurality of managed devices based on the one or more attributes of the plurality of managed devices after determining the multi-entity profile, or may generate a multivariate metric model for the plurality of managed devices after determining the multi-entity profile; and may determine a set of device sub-models, of the set of sub-models, after grouping the plurality of managed devices or based on the multivariate metric model. In some implementations, the device analytics platform may generate, as the model, at least one of: an isolation forest, or a neural network; and may determine the respective scores utilizing the at least one of the isolation forest or the neural network.

In some implementations, the device analytics platform may determine the multi-entity profile based on at least one of: respective types of the plurality of managed devices, respective ages of the plurality of managed devices, or respective locations of the plurality of managed devices. In some implementations, the device analytics platform may determine respective qualities of the operations of the plurality of managed devices based on the respective scores for the plurality of managed devices; and may prevent the one or more alerts from being sent to a client device associated with managing the plurality of managed devices, to suppress the alert; and may provide a message, for display, that identifies that the alert was suppressed.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
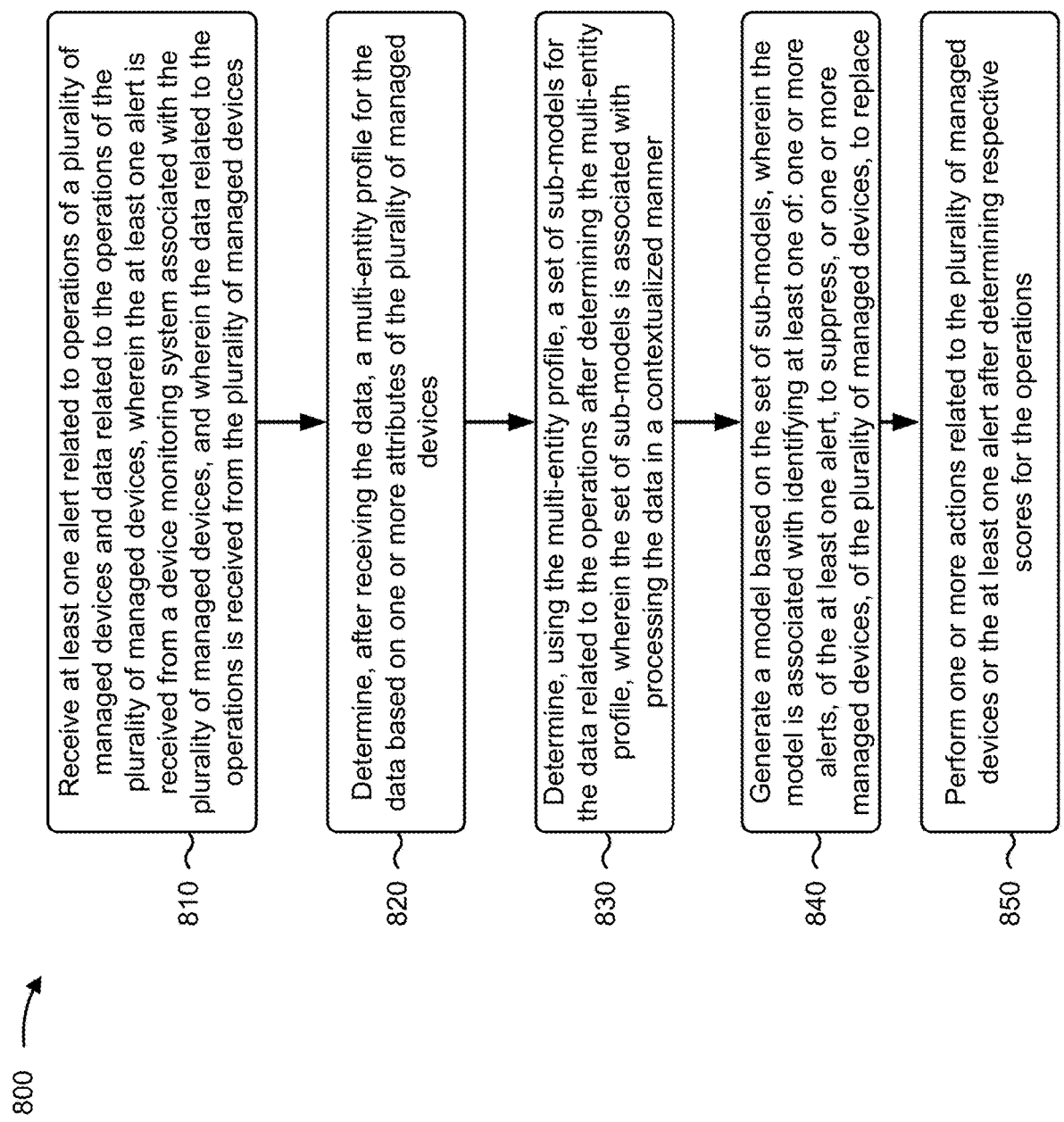

FIG. 8 is a flow chart of an example process 800 for analyzing device-related data to generate and/or suppress device-related alerts. In some implementations, one or more process blocks of FIG. 8 may be performed by a device analytics platform (e.g., device analytics platform 530). In some implementations, one or more process blocks of FIG. 8 may be performed by another device or a group of devices separate from or including the device analytics platform, such as a client device (e.g., client device 510), a server device (e.g., server device 520), a computing resource (e.g., computing resource 534), a device monitoring system (e.g., device monitoring system 540), and/or the like.

As shown in FIG. 8, process 800 may include receiving at least one alert related to operations of a plurality of managed devices and data related to the operations of the plurality of managed devices, wherein the at least one alert is received from a device monitoring system associated with the plurality of managed devices, and wherein the data related to the operations is received from the plurality of managed devices (block 810). For example, the device analytics platform (e.g., using computing resource 534, processor 620, communication interface 670, and/or the like) may receive at least one alert related to operations of a plurality of managed devices and data related to the operations of the plurality of managed devices, as described above. In some implementations, the at least one alert is received from a device monitoring system associated with the plurality of managed devices. In some implementations, the data related to the operations is received from the plurality of managed devices.

As further shown in FIG. 8, process 800 may include determining, after receiving the data, a multi-entity profile for the data based on one or more attributes of the plurality of managed devices (block 820). For example, the device analytics platform (e.g., using computing resource 534, processor 620, and/or the like) may determine, after receiving the data, a multi-entity profile for the data based on one or more attributes of the plurality of managed devices, as described above.

As further shown in FIG. 8, process 800 may include determining, using the multi-entity profile, a set of sub-models for the data related to the operations after determining the multi-entity profile, wherein the set of sub-models is associated with processing the data in a contextualized manner (block 830). For example, the device analytics platform (e.g., using computing resource 534, processor 620, and/or the like) may determine, using the multi-entity profile, a set of sub-models for the data related to the operations after determining the multi-entity profile, as described above. In some implementations, the set of sub-models is associated with processing the data in a contextualized manner.

As further shown in FIG. 8, process 800 may include generating a model based on the set of sub-models, wherein the model is associated with identifying at least one of: one or more alerts, of the at least one alert, to suppress, or one or more managed devices, of the plurality of managed devices, to replace (block 840). For example, the device analytics platform (e.g., using computing resource 534, processor 620, and/or the like) may generate a model based on the set of sub-models, as described above. In some implementations, the model is associated with identifying at least one of: one or more alerts, of the at least one alert, to suppress, or one or more managed devices, of the plurality of managed devices, to replace.

As further shown in FIG. 8, process 800 may include performing one or more actions related to the plurality of managed devices or the at least one alert after determining respective scores for the operations (block 850). For example, the device analytics platform (e.g., using computing resource 534, processor 620, memory 630, storage component 640, output component 660, communication interface 670, and/or the like) may perform one or more actions related to the plurality of managed devices or the at least one alert after determining respective scores for the operations, as described above.

Process 800 may include additional implementations, such as any single implementation or any combination of implementations described herein, and/or in connection with one or more other processes described elsewhere herein.

In some implementations, the device analytics platform may determine, utilizing the model after generating the model, the respective scores for the operations of the plurality of managed devices, wherein the respective scores indicate respective qualities of the operations of the plurality of managed devices; and may generate a recommendation to suppress the one or more alerts based on the respective scores. In some implementations, the device analytics platform may determine, based on the respective scores after determining the respective scores, that the one or more managed devices, of the plurality of managed devices, need to be replaced; and may generate a work order related to replacing the one or more managed devices after determining that the one or more managed devices need to be replaced.

In some implementations, the device analytics platform may generate the model based on combining a set of metric sub-models, of the set of sub-models, and a set of device sub-models, of the set of sub-models, into the model. In some implementations, the data related to the operations of the plurality of managed devices may identify values for at least one of: respective input utilizations for the plurality of managed devices, respective output utilizations for the plurality of managed devices, respective central processing unit (CPU) utilizations for the plurality of managed devices, or respective jitters associated with communications of the plurality of managed devices.

In some implementations, the device analytics platform may power down a first managed device, of the plurality of managed devices, based on a first score, of the respective scores, for the first managed device; and may power on a second managed device, of the plurality of managed devices, in association with powering down the first device based on the first score. In some implementations, the multi-entity profile includes a set of groupings of the data related to the operations by the one or more attributes of the plurality of managed devices.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a flow chart of an example process 900 for analyzing device-related data to generate and/or suppress device-related alerts. In some implementations, one or more process blocks of FIG. 9 may be performed by a device analytics platform (e.g., device analytics platform 530). In some implementations, one or more process blocks of FIG. 9 may be performed by another device or a group of devices separate from or including the device analytics platform, such as a client device (e.g., client device 510), a server device (e.g., server device 520), a computing resource (e.g., computing resource 534), a device monitoring system (e.g., device monitoring system 540), and/or the like.

As shown in FIG. 9, process 900 may include receiving data related to a plurality of managed devices, wherein the data includes at least one of: diagnostic data associated with operations of the plurality of managed devices, call dispatch data associated with respective service histories associated with the plurality of managed devices, or customer data associated with respective customers associated with the plurality of managed devices (block 910). For example, the device analytics platform (e.g., using computing resource 534, processor 620, communication interface 670, and/or the like) may receive data related to a plurality of managed devices, as described above. In some implementations, the data includes at least one of: diagnostic data associated with operations of the plurality of managed devices, call dispatch data associated with respective service histories associated with the plurality of managed devices, or customer data associated with respective customers associated with the plurality of managed devices.

As further shown in FIG. 9, process 900 may include determining, after receiving the data, a multi-entity profile for the data, wherein the multi-entity profile includes a set of groupings of the data by one or more attributes of the plurality of managed devices (block 920). For example, the device analytics platform (e.g., using computing resource 534, processor 620, and/or the like) may determine, after receiving the data, a multi-entity profile for the data, as described above. In some implementations, the multi-entity profile includes a set of groupings of the data by one or more attributes of the plurality of managed devices.

As further shown in FIG. 9, process 900 may include determining, using the multi-entity profile, a set of sub-models for the data after determining the multi-entity profile, wherein the set of sub-models is associated with processing the data in a contextualized manner (block 930). For example, the device analytics platform (e.g., using computing resource 534, processor 620, and/or the like) may determine, using the multi-entity profile, a set of sub-models for the data after determining the multi-entity profile, as described above. In some implementations, the set of sub-models is associated with processing the data in a contextualized manner.

As further shown in FIG. 9, process 900 may include generating a model based on the set of sub-models (block 940). For example, the device analytics platform (e.g., using computing resource 534, processor 620, and/or the like) may generate a model based on the set of sub-models, as described above.

As further shown in FIG. 9, process 900 may include performing, after generating the model, one or more actions related to the plurality of managed devices based on respective scores associated with the plurality of managed devices (block 950). For example, the device analytics platform (e.g., using computing resource 534, processor 620, memory 630, storage component 640, output component 660, communication interface 670, and/or the like) may perform one or more actions related to the plurality of managed devices based on respective scores associated with the plurality of managed devices after generating the model, as described above.

Process 900 may include additional implementations, such as any single implementation or any combination of implementations described herein and/or in connection with one or more other processes described herein.

In some implementations, the device analytics platform may determine, from the data, the respective service histories of the plurality of managed devices after receiving the data. In some implementations, the device analytics platform may determine, utilizing the model, the respective scores for the plurality of managed devices, wherein the respective scores indicate respective qualities of the operations of the plurality of managed devices based on the respective service histories.

In some implementations, the device analytics platform may receive a service request telephone call related to a managed device of the plurality of managed devices; and may determine a priority for the service request telephone call based on a score, of the respective scores, associated with the operations of the managed device. In some implementations, the device analytics platform may transfer, based on the priority, the service request telephone call to at least one of: a telephone associated with a customer service representative, or an interactive voice response (IVR) system. In some implementations, the device analytics platform may send a message to a network technician to dispatch the network technician to a location of the managed device associated with the service request telephone call based on the priority.

Although FIG. 9 shows example blocks of process 900, in some implementations process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, depending on the context.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, an indication of at least one alert related to operations of a plurality of managed devices and data related to the operations of the plurality of managed devices,
     wherein the indication of the at least one alert is received from a monitoring system that is monitoring the operations of the plurality of managed devices;
   determining, by the device and after receiving the data, a multi-entity profile for the data,
     wherein the multi-entity profile includes a set of groupings of the data by one or more attributes of the plurality of managed devices;
   processing, by the device, the multi-entity profile using a kernel density estimation (KDE) model after determining the multi-entity profile;
   determining, by the device and using the multi-entity profile, a set of sub-models for the data based on processing the multi-entity profile using the KDE model,
     wherein at least one sub-model, of the set of sub-models, is associated with contextualizing the data to the plurality of managed devices;
   generating, by the device, a model based on the set of sub-models;
   determining, by the device and utilizing the model after generating the model, respective scores for the plurality of managed devices,
     wherein the respective scores are used to identify at least one of:

one or more alerts, of the at least one alert, to suppress, or
one or more managed devices, of the plurality of managed devices, to replace; and
performing, by the device, one or more actions related to at least one of the plurality of managed devices and the at least one alert after determining the respective scores for the plurality of managed devices,
wherein performing the one or more actions comprises:
generating a work order related to replacing the at least one of the plurality of managed devices.

2. The method of claim 1, wherein the plurality of managed devices includes a plurality of network devices.

3. The method of claim 1,
wherein determining the set of sub-models comprises:
determining a set of metric sub-models, of the set of sub-models, based on processing the multi-entity profile using the KDE model.

4. The method of claim 1, further comprising:
grouping the plurality of managed devices based on the one or more attributes of the plurality of managed devices after determining the multi-entity profile, or
generating a multivariate metric model for the plurality of managed devices after determining the multi-entity profile; and
wherein determining the set of sub-models comprises:
determining a set of device sub-models, of the set of sub-models, after grouping the plurality of managed devices or based on the multivariate metric model.

5. The method of claim 1, wherein generating the model comprises:
generating, as the model, at least one of:
an isolation forest, or
a neural network; and
wherein determining the respective scores comprises:
determining the respective scores utilizing the at least one of the isolation forest or the neural network.

6. The method of claim 1, wherein determining the multi-entity profile comprises:
determining the multi-entity profile based on at least one of:
respective types of the plurality of managed devices,
respective ages of the plurality of managed devices, or
respective locations of the plurality of managed devices.

7. The method of claim 1, further comprising:
determining respective qualities of the operations of the plurality of managed devices based on the respective scores for the plurality of managed devices; and
wherein performing the one or more actions comprises:
preventing the one or more alerts from being sent to a client device associated with managing the plurality of managed devices, to suppress the at least one or more alerts; and
providing a message, for display via a display, that identifies that the at least one or more alerts was suppressed.

8. A device, comprising:
one or more memories; and
one or more processors, communicatively coupled to the one or more memories, to:
receive at least one alert related to operations of a plurality of managed devices and data related to the operations of the plurality of managed devices,
wherein the at least one alert is received from a device monitoring system associated with the plurality of managed devices, and
wherein the data related to the operations is received from the plurality of managed devices;
determine, after receiving the data, a multi-entity profile for the data based on one or more attributes of the plurality of managed devices;
process the multi-entity profile using a kernel density estimation (KDE) model after determining the multi-entity profile;
determine, using the multi-entity profile, a set of sub-models for the data related to the operations based on processing the multi-entity profile using the KDE model,
wherein the set of sub-models is associated with processing the data in a contextualized manner;
generate a model based on the set of sub-models,
wherein the model is associated with identifying at least one of:
one or more alerts, of the at least one alert, to suppress, or
one or more managed devices, of the plurality of managed devices, to replace; and
perform one or more actions related to the plurality of managed devices or the at least one alert after determining respective scores for the operations,
wherein the one or more processors, when performing the one or more actions, are to:
generate a work order related to replacing the at least one of the plurality of managed devices.

9. The device of claim 8, wherein the one or more processors are further to:
determine, utilizing the model after generating the model, the respective scores for the operations of the plurality of managed devices,
wherein the respective scores indicate respective qualities of the operations of the plurality of managed devices; and
wherein the one or more processors, when performing the one or more actions, are to:
generate a recommendation to suppress the one or more alerts based on the respective scores.

10. The device of claim 9, wherein the one or more processors, when performing the one or more actions, are to:
determine, based on the respective scores after determining the respective scores, that the one or more managed devices, of the plurality of managed devices, need to be replaced; and
generate the work order after determining that the one or more managed devices need to be replaced.

11. The device of claim 8, wherein the one or more processors, when generating the model, are to:
generate the model based on combining a set of metric sub-models, of the set of sub-models, and a set of device sub-models, of the set of sub-models, into the model.

12. The device of claim 8, wherein the data related to the operations of the plurality of managed devices identifies values for at least one of:
respective input utilizations for the plurality of managed devices,
respective output utilizations for the plurality of managed devices,
respective central processing unit (CPU) utilizations for the plurality of managed devices, or
respective jitters associated with communications of the plurality of managed devices.

13. The device of claim 8, wherein the one or more processors, when performing the one or more actions, are to:

power down a first managed device, of the plurality of managed devices, based on a first score, of the respective scores, for the first managed device; and power on a second managed device, of the plurality of managed devices, after powering down the first managed device based on the first score.

14. The device of claim 8, wherein the multi-entity profile includes a set of groupings of the data related to the operations by the one or more attributes of the plurality of managed devices.

15. A non-transitory computer-readable medium storing instructions, the instructions comprising:

one or more instructions that, when executed by one or more processors, cause the one or more processors to:
receive data related to a plurality of managed devices, wherein the data includes at least one of:
diagnostic data associated with operations of the plurality of managed devices,
call dispatch data associated with respective service histories associated with the plurality of managed devices, or
customer data associated with respective customers associated with the plurality of managed devices;
determine, after receiving the data, a multi-entity profile for the data,
wherein the multi-entity profile includes a set of groupings of the data by one or more attributes of the plurality of managed devices;
process the multi-entity profile using a kernel density estimation (KDE) model after determining the multi-entity profile;
determine, using the multi-entity profile, a set of sub-models for the data based on processing the multi-entity profile using the KDE model,
wherein the set of sub-models is associated with processing the data in a contextualized manner;
generate a model based on the set of sub-models; and
perform, after generating the model, one or more actions related to the plurality of managed devices based on respective scores for the plurality of managed devices.

16. The non-transitory computer-readable medium of claim 15, wherein the one or more instructions, when executed by the one or more processors, further cause the one or more processors to:

determine, from the data, the respective service histories of the plurality of managed devices after receiving the data.

17. The non-transitory computer-readable medium of claim 16, wherein the one or more instructions, when executed by the one or more processors, cause the one or more processors to:

determine, utilizing the model, the respective scores for the plurality of managed devices,
wherein the respective scores indicate respective qualities of the operations of the plurality of managed devices based on the respective service histories.

18. The non-transitory computer-readable medium of claim 15, wherein the one or more instructions, when executed by the one or more processors, further cause the one or more processors to:

receive a service request telephone call related to a managed device of the plurality of managed devices; and
wherein the one or more instructions, that cause the one or more processors to perform the one or more actions, cause the one or more processors to:
determine a priority for the service request telephone call based on a score, of the respective scores, associated with the operations of the managed device.

19. The non-transitory computer-readable medium of claim 18, wherein the one or more instructions, that cause the one or more processors to perform the one or more actions, cause the one or more processors to:

transfer, based on the priority, the service request telephone call to at least one of:
a telephone associated with a customer service representative, or
an interactive voice response (IVR) system.

20. The non-transitory computer-readable medium of claim 18, wherein the one or more instructions, that cause the one or more processors to perform the one or more actions, cause the one or more processors to:

send a message to a network technician to dispatch the network technician to a location of the managed device associated with the service request telephone call based on the priority.

* * * * *